United States Patent
Ang et al.

(10) Patent No.: US 10,798,774 B2
(45) Date of Patent: Oct. 6, 2020

(54) TECHNIQUES AND APPARATUSES FOR BANDWIDTH PART WAKE-UP SIGNALING

(71) Applicant: QUALCOMM Incorporated, San Diego, CA (US)

(72) Inventors: Peter Pui Lok Ang, San Diego, CA (US); Linhai He, San Diego, CA (US); Joseph Binamira Soriaga, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 8 days.

(21) Appl. No.: 16/128,136

(22) Filed: Sep. 11, 2018

(65) Prior Publication Data

US 2019/0090299 A1   Mar. 21, 2019

Related U.S. Application Data

(60) Provisional application No. 62/616,372, filed on Jan. 11, 2018, provisional application No. 62/561,096, filed on Sep. 20, 2017.

(51) Int. Cl.
*H04W 76/28* (2018.01)
*H04W 52/02* (2009.01)
(Continued)

(52) U.S. Cl.
CPC .......... *H04W 76/28* (2018.02); *H04L 5/003* (2013.01); *H04L 5/0053* (2013.01);
(Continued)

(58) Field of Classification Search
CPC ........... H04W 72/042; H04W 72/0446; H04W 76/28; H04W 52/0229; H04W 28/20; H04L 5/0053
See application file for complete search history.

(56) References Cited

U.S. PATENT DOCUMENTS 7,971,086 B2 * 6/2011 Itkin .................... G06F 1/3203
                                                 713/330
10,524,271 B2 * 12/2019 Lindoff ................ H04L 5/0053
(Continued)

OTHER PUBLICATIONS

Apple Inc: "Control Information for UE Power Saving", 3GPP DRAFT; R1-1716553 Control Information for UE Power Saving. V1, 3rd Generation Partnership-Project (3GPP), Mobile Competence Centre; 650 Route Des Lucioles; F-06921 Sophia-Antipolis Cedex; France, vol. RAN WG1, No. Nagoya, Japan; Sep. 18, 2017-Sep. 21, 2017 Sep. 17, 2017, XP051340006, Retrieved from the Internet: URL:http://www.3gpp.org/ftp/Meetings_3GPP_SYNC/RAN1/Docs/ [retrieved on Sep. 17, 2017], 6 pages.

(Continued)

*Primary Examiner* — Rasheed Gidado
(74) *Attorney, Agent, or Firm* — Harrity & Harrity, LLP

(57) ABSTRACT

Various aspects of the present disclosure generally relate to wireless communication. In some aspects, a user equipment may monitor, in a first bandwidth part, of a plurality of bandwidth parts, associated with a first monitoring periodicity and in a downlink control channel, for a downlink control information (DCI) message. The user equipment may selectively transition, based at least in part on the DCI message, from the first bandwidth part to a second bandwidth part, of the plurality of bandwidth parts, associated with a second monitoring periodicity that is less than the first monitoring periodicity. Numerous other aspects are provided.

30 Claims, 21 Drawing Sheets

(51) Int. Cl.
*H04L 5/00* (2006.01)
*H04W 28/20* (2009.01)
*H04W 72/04* (2009.01)
*H04W 72/12* (2009.01)
*H04L 27/26* (2006.01)
*H04W 72/14* (2009.01)

(52) U.S. Cl.
CPC ....... *H04W 28/20* (2013.01); *H04W 52/0229* (2013.01); *H04W 72/042* (2013.01); *H04W 72/0446* (2013.01); *H04W 72/1289* (2013.01); *H04L 5/0048* (2013.01); *H04L 27/26* (2013.01); *H04W 72/0453* (2013.01); *H04W 72/14* (2013.01)

(56) References Cited

U.S. PATENT DOCUMENTS

| | | | |
|---|---|---|---|
| 2007/0149239 A1* | 6/2007 | Choi | H03G 3/3047 455/522 |
| 2011/0274074 A1 | 11/2011 | Lee et al. | |
| 2017/0230994 A1* | 8/2017 | You | H04W 72/042 |
| 2017/0325225 A1* | 11/2017 | Dinan | H04W 72/0446 |
| 2017/0367046 A1* | 12/2017 | Papasakellariou | H04W 52/0216 |
| 2018/0019843 A1* | 1/2018 | Papasakellariou | H04L 1/1864 |
| 2018/0098298 A1* | 4/2018 | Jung | H04L 27/266 |
| 2018/0279289 A1* | 9/2018 | Islam | H04L 5/0094 |
| 2018/0295607 A1* | 10/2018 | Lindoff | H04W 72/042 |
| 2019/0045549 A1* | 2/2019 | Wu | H04W 72/085 |
| 2020/0059345 A1* | 2/2020 | Pelletier | H04W 74/006 |

OTHER PUBLICATIONS

Interdigital Inc: "C-DRX with Multiple Configurations", 3GPP DRAFT; R2-1706683, 3rd Generation Partnership-Project (3GPP), Mobile Competence Centre; 650 Route Des Lucioles; F-06921 Sophia-Antipolis Cedex; France, vol. RAN WG2, No. Qingdao, P.R. China; Jun. 27, 2017-Jun. 29, 2017 Jun. 26, 2017, XP051301183, Retrieved from the Internet: URL:http://www.3gpp.org/ftp/Meetings_3GPP_SYNC/RAN2/Docs/ [retrieved on Jun. 26, 2017], 5 pages.
International Search Report and Written Opinion—PCT/US2018/050629—ISA/EPO—dated Nov. 27, 2018.
Qualcomm Incorporated: "Open Issues on BWP", 3GPP DRAFT; R1-1718580 Open Issues on BWP, 3rd Generation Partnership-Project (3GPP), Mobile Competence Centre; 650 Route Des Lucioles; F-06921 Sophia-Antipolis Cedex; France, vol. RAN WG1, No. Prague, Czech Republic; Oct. 9, 2017-Oct. 13, 2017 Oct. 8, 2017, XP051341760, Retrieved from the Internet: URL:http://www.3gpp.org/ftp/Meetings_3GPP_SYNC/RAN1/Docs/ [retrieved on Oct. 8, 2017], 8 pages.
Qualcomm Incorporated: "UE Power Saving during Active State", 3GPP Draft; R2-1709117 UE Power Saving During Active State, 3rd Generation Partnership-Project (3GPP), Mobile Competence Centre; 650 Route Des Lucioles; F-06921 Sophia-Antipolis Cedex; France, vol. RAN WG2, No. Berlin, Germany; Aug. 21, 2017-Aug. 25, 2017, Aug. 20, 2017 (Aug. 20, 2017), pp. 1-6, XP051318910, Retrieved from the Internet: URL:http://www.3gpp.org/ftp/Meetings_3GPP_SYNC/RAN2/Docs/ [retrieved on Aug. 20, 2017].

* cited by examiner

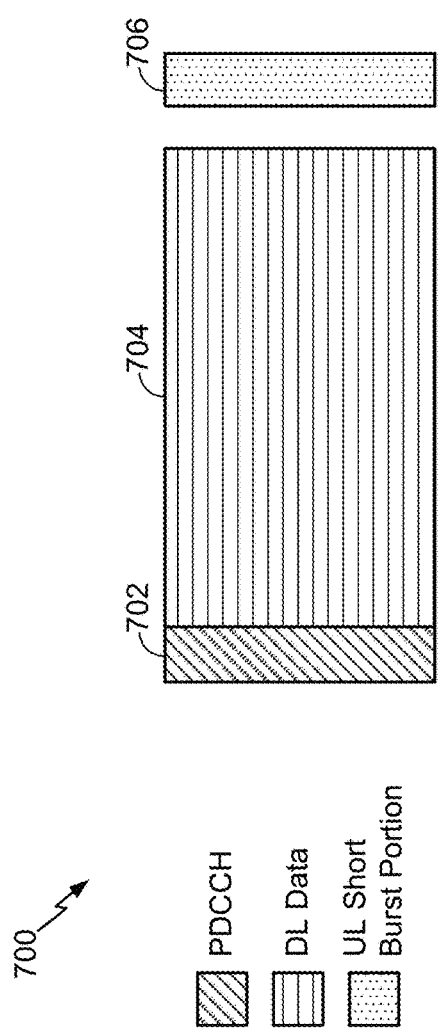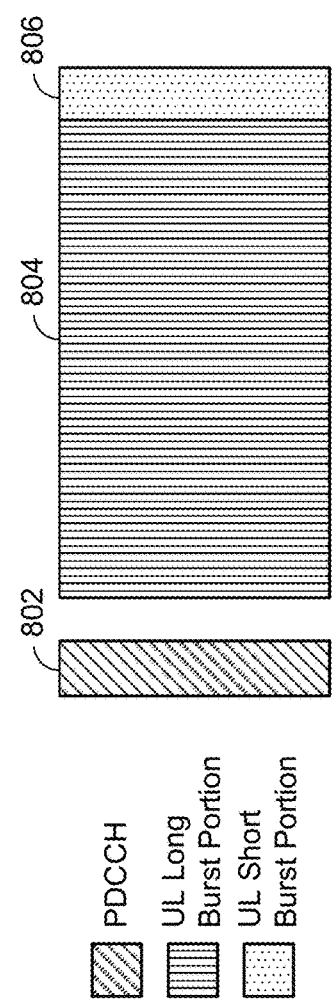
FIG. 7
FIG. 8

TECHNIQUES AND APPARATUSES FOR BANDWIDTH PART WAKE-UP SIGNALING

CROSS-REFERENCE TO RELATED APPLICATIONS UNDER 35 U.S.C. § 119

This application claims priority to Provisional Patent Application No. 62/561,096, filed on Sep. 20, 2017, entitled "TECHNIQUES AND APPARATUSES FOR BANDWIDTH PART WAKE-UP SIGNALING," which is hereby expressly incorporated by reference herein.

This application claims priority to Provisional Patent Application No. 62/616,372, filed on Jan. 11, 2018, entitled "TECHNIQUES AND APPARATUSES FOR BANDWIDTH PART WAKE-UP SIGNALING," which is hereby expressly incorporated by reference herein.

FIELD OF THE DISCLOSURE

Aspects of the present disclosure generally relate to wireless communication, and to techniques and apparatuses for bandwidth part wake-up signaling.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, etc.). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation.

SUMMARY

In some aspects, a method for wireless communication may include monitoring, in a first bandwidth part, of a plurality of bandwidth parts, associated with a first set of timing parameters and in a downlink control channel, for a downlink control information (DCI) message. The method may include selectively transitioning, based at least in part on the DCI message, from the first bandwidth part to a second bandwidth part, of the plurality of bandwidth parts, associated with a second set of timing parameters that is different than the first set of timing parameters.

In some aspects, a user equipment for wireless communication may include a memory and one or more processors. The memory and the one or more processors may be configured to monitor, in a first bandwidth part, of a plurality of bandwidth parts, associated with a first set of timing parameters and in a downlink control channel, for a downlink control information (DCI) message. The memory and the one or more processors may be configured to selectively transition, based at least in part on the DCI message, from the first bandwidth part to a second bandwidth part, of the plurality of bandwidth parts, associated with a second set of timing parameters that is different than the first set of timing parameters.

In some aspects, a non-transitory computer-readable medium may store one or more instructions for wireless communication. The one or more instructions, when executed by one or more processors of a user equipment, may cause the one or more processors to monitor, in a first bandwidth part, of a plurality of bandwidth parts, associated with a first set of timing parameters and in a downlink control channel, for a downlink control information (DCI) message. The one or more instructions, when executed by the one or more processors of the user equipment, may cause the one or more processors to selectively transition, based at least in part on the DCI message, from the first bandwidth part to a second bandwidth part, of the plurality of bandwidth parts, associated with a second set of timing parameters that is different than the first set of timing parameters.

In some aspects, an apparatus for wireless communication may include means for monitoring, in a first bandwidth part, of a plurality of bandwidth parts, associated with a first set of timing parameters and in a downlink control channel, for a downlink control information (DCI) message. The apparatus may include means for selectively transitioning, based at least in part on the DCI message, from the first bandwidth part to a second bandwidth part, of the plurality of bandwidth parts, associated with a second set of timing parameters that is different than the first set of timing parameters.

In some aspects, a method for wireless communication may include monitoring, in a first bandwidth part, of a plurality of bandwidth parts, associated with a first monitoring periodicity and in a downlink control channel, for a downlink control information (DCI) message. The DCI message may include bandwidth part activation information or bandwidth part activation information and a downlink grant. The DCI may be a user equipment-specific, bandwidth part-specific DCI. The method may include selectively transitioning, based at least in part on the DCI message, from the first bandwidth part to a second bandwidth part, of the plurality of bandwidth parts, associated with a second monitoring periodicity that is less than the first monitoring periodicity.

In some aspects, a user equipment for wireless communication may include one or more processors configured to monitor, in a first bandwidth part, of a plurality of bandwidth parts, associated with a first monitoring periodicity and in a downlink control channel, for a DCI message. The DCI message may include bandwidth part activation information or bandwidth part activation information and a downlink grant. The DCI may be a user equipment-specific, bandwidth part-specific DCI. The one or more processors may be configured to selectively transition, based at least in part on the DCI message, from the first bandwidth part to a second bandwidth part, of the plurality of bandwidth parts, associated with a second monitoring periodicity that is less than the first monitoring periodicity.

In some aspects, a non-transitory computer-readable medium may store one or more instructions for wireless communication. The one or more instructions, when executed by one or more processors of a user equipment, may cause the one or more processors to monitor, in a first bandwidth part, of a plurality of bandwidth parts, associated with a first monitoring periodicity and in a downlink control channel, for a DCI message. The DCI message may include bandwidth part activation information or bandwidth part activation information and a downlink grant. The DCI may be a user equipment-specific, bandwidth part-specific DCI. The one or more instructions, when executed by the one or more processors, may cause the one or more processors to selectively transitioning, based at least in part on the DCI message, from the first bandwidth part to a second bandwidth part, of the plurality of bandwidth parts, associated with a second monitoring periodicity that is less than the first monitoring periodicity In some aspects, an apparatus for wireless communication may include means for monitoring, in a first bandwidth part, of a plurality of bandwidth parts, associated with a first monitoring periodicity and in a downlink control channel, for a DCI message. The DCI message may include bandwidth part activation information or bandwidth part activation information and a downlink grant. The DCI may be a user equipment-specific, bandwidth part-specific DCI. The apparatus may include means for selectively transitioning, based at least in part on the DCI message, from the first bandwidth part to a second bandwidth part, of the plurality of bandwidth parts, associated with a second monitoring periodicity that is less than the first monitoring periodicity.

In some aspects, a method for wireless communication may include monitoring, in a first bandwidth part, of a plurality of bandwidth parts, associated with a first monitoring periodicity and in a downlink control channel, for a downlink control information (DCI) message. The method may include selectively transitioning, based at least in part on the DCI message, from the first bandwidth part to a second bandwidth part, of the plurality of bandwidth parts, associated with a second monitoring periodicity that is less than the first monitoring periodicity.

In some aspects, a user equipment for wireless communication may include a memory and one or more processors. The memory and the one or more processors may be configured to monitor, in a first bandwidth part, of a plurality of bandwidth parts, associated with a first monitoring periodicity and in a downlink control channel, for a DCI message. The memory and the one or more processors may be configured to selectively transition, based at least in part on the DCI message, from the first bandwidth part to a second bandwidth part, of the plurality of bandwidth parts, associated with a second monitoring periodicity that is less than the first monitoring periodicity.

In some aspects, a non-transitory computer-readable medium may store one or more instructions for wireless communication. The one or more instructions, when executed by one or more processors of a user equipment, may cause the one or more processors to monitor, in a first bandwidth part, of a plurality of bandwidth parts, associated with a first monitoring periodicity and in a downlink control channel, for a DCI message. The one or more instructions, when executed by the one or more processors of the user equipment, may cause the one or more processors to selectively transition, based at least in part on the DCI message, from the first bandwidth part to a second bandwidth part, of the plurality of bandwidth parts, associated with a second monitoring periodicity that is less than the first monitoring periodicity In some aspects, an apparatus for wireless communication may include means for monitoring, in a first bandwidth part, of a plurality of bandwidth parts, associated with a first monitoring periodicity and in a downlink control channel, for a DCI message. The apparatus may include means for selectively transitioning, based at least in part on the DCI message, from the first bandwidth part to a second bandwidth part, of the plurality of bandwidth parts, associated with a second monitoring periodicity that is less than the first monitoring periodicity.

Aspects generally include a method, apparatus, system, computer program product, non-transitory computer-readable medium, base station, user equipment, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 7 is a diagram illustrating an example of a downlink (DL)-centric subframe, in accordance with various aspects of the present disclosure.

FIG. 8 is a diagram illustrating an example of an uplink (UL)-centric subframe, in accordance with various aspects of the present disclosure.

DETAILED DESCRIPTION

Figure 1:
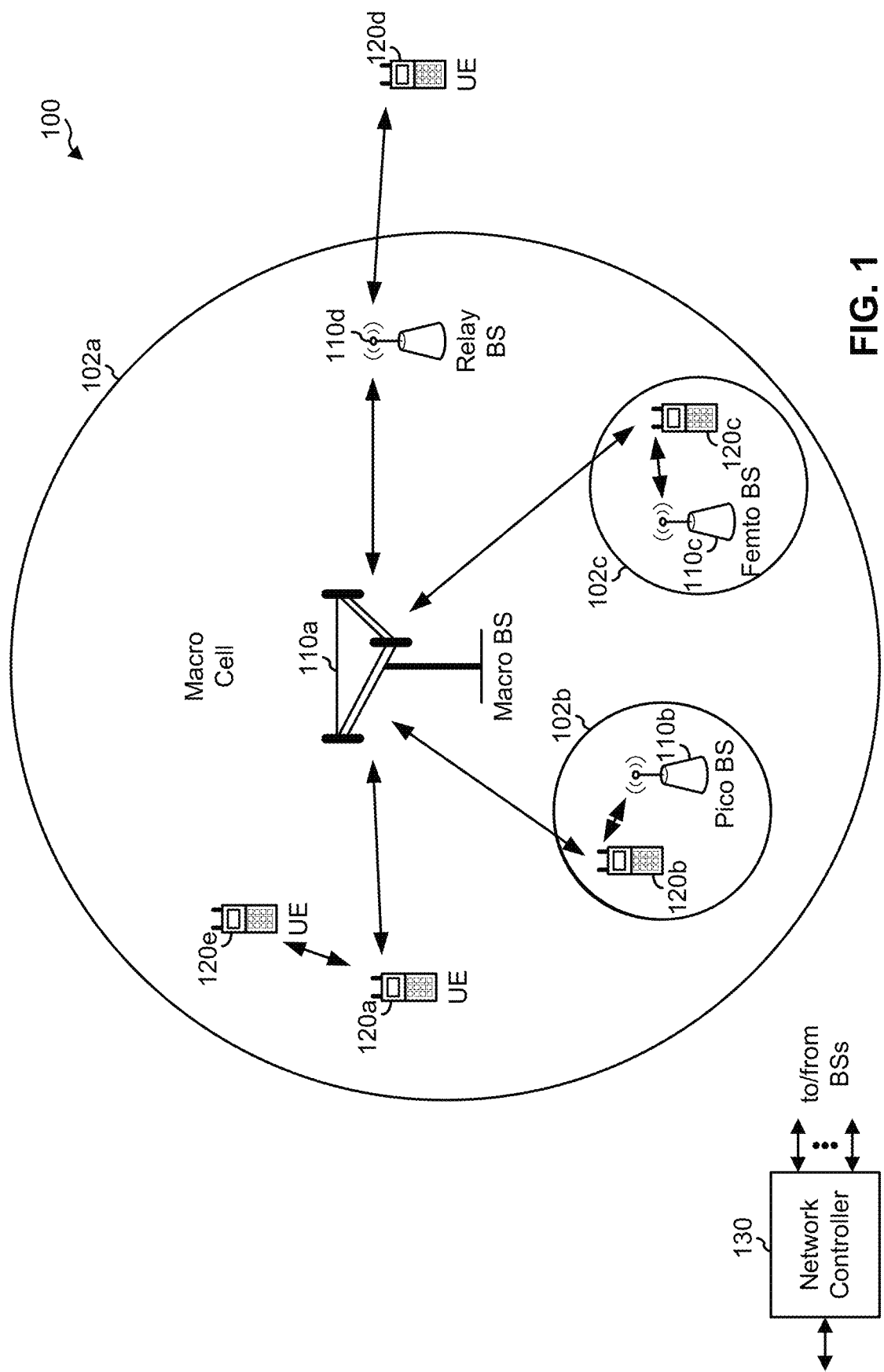
FIG. 1 is a block diagram conceptually illustrating an example of a wireless communication network, in accordance with various aspects of the present disclosure.

In certain communications systems, such as 5G, NR, and/or the like, bandwidth parts may be configured for a UE. A UE may use a particular bandwidth part of a plurality of available bandwidth parts for communication with a BS. The UE may monitor a downlink control channel in a particular bandwidth part, such as a physical downlink control channel (PDCCH), in each subframe, slot, and/or the like to determine whether to receive downlink data from the BS. However, when the UE remains connected to the BS for a threshold period of time to monitor the downlink control channel in each subframe, the UE may utilize excessive power resources, which may limit UE battery life.

Thus, the UE may enable a discontinuous reception (DRX) mode to enable the UE to periodically transfer from a first mode (e.g., a high-power mode) to a second mode (e.g., a low-power mode) to reduce a utilization of power resources, thereby enhancing UE battery life, and to transfer from the second mode to the first mode to improve data traffic communication capability and reduce latency. Although some aspects are described herein in terms of a high-power mode and a low-power mode, other combinations or quantities of modes are possible. To enable the DRX mode, the UE may periodically monitor the downlink control channel for an on duration period of time and based at least in part on a monitoring periodicity associated with a wake cycle.

A BS may transmit, and the UE may receive wake-up signaling to indicate that the UE is to monitor for the downlink control channel. However, some bandwidth part monitoring periodicity configurations may result in excessive time between opportunities to receive a downlink control information (DCI) message associated with triggering a transition between bandwidth parts, thereby resulting in the UE remaining in a first bandwidth part an excessive period of time before transition to a second bandwidth part and negatively impacting utilization of energy resources, data traffic activity, latency, and/or the like. Moreover, a dedicated DCI message may not be configured to provide wake-up signaling for bandwidth part communication. Moreover, utilizing dedicated DCI messages for wake-up signaling may impact search space candidate blind decoding for the downlink control channel, thereby negatively impacting communications for a network.

Some aspects, described herein, may provide scheduling flexibility for a bandwidth part activation or bandwidth part deactivation, such as a DCI for bandwidth part activation or bandwidth part deactivation, to provide wake-up signaling for bandwidth part communication with the bandwidth part activation information. For example, a UE may receive a DCI message that includes bandwidth part activation information, and may selectively transition from a first bandwidth part to a second bandwidth part based at least in part on the DCI message. In this case, based at least in part on the UE decoding a downlink control channel (e.g., the DCI message with the bandwidth part activation information), the UE may transition to a second bandwidth part and may ramp up a modem power from a low-power mode to a high-power mode. In contrast, based at least in part on the UE not decoding the downlink control channel, the UE may not transition to the second bandwidth part, and may transfer from a low-power mode to a sleep mode (i.e., a lower power mode relative to the low-power mode). In this way, the UE uses dynamic signaling of a bandwidth part communication for wake-up signaling, thereby enabling the UE to transition between power modes to receive information, to reduce energy consumption (e.g., in the slope mode), and/or the like. Moreover, some aspects, described herein may leverage bandwidth part activation or bandwidth part deactivation signaling to trigger channel state information reference signal measurements, tracking reference signal measurements, and/or the like.

Some aspects, described herein, may utilize dynamic signaling of a bandwidth part activation or bandwidth part deactivation, such as a DCI for bandwidth part activation, to provide wake-up signaling for bandwidth part communication with the bandwidth part activation information. For example, a UE may receive a UE-specific, bandwidth part-specific DCI message that includes bandwidth part activation information, and may selectively transition from a first bandwidth part to a second bandwidth part based at least in part on the DCI message. In this case, based at least in part on the UE decoding a downlink control channel (e.g., the DCI message with the bandwidth part activation information), the UE may transition to a second bandwidth part and may ramp up a modem power from a low-power mode to a high-power mode. The transition leads the modem to a higher performance state, which may include, relative to a lower performance state, processing of higher data throughput, reception over a wider bandwidth, support for a higher modulation order and/or coding scheme, a higher quantity of MIMO layers, support for transmission of HARQ-ACK for received data, support for processing the data channel and the control channel concurrently or sequentially within a threshold period of time, and/or the like. In contrast, based at least in part on the UE not decoding the downlink control channel, the UE may not transition to the second bandwidth part, and may transition from a low-power mode to a sleep mode (i.e., a lower power mode relative to the low-power mode). In this way, the bandwidth part activation signals may serve as wake-up signaling using dynamic signaling of a bandwidth part communication, allowing the UE to efficiently transition between wake, sleep, or other states to improve utilization of energy resources, data traffic activity, latency, and/or the like.

Some aspects, described herein may provide a multi-stage (e.g., a two-stage) wake up procedure for the UE. For example, a UE may transition from a sleep state associated with a low-power bandwidth part to a wake state associated with the low-power bandwidth part, and which enables a microsleep mode for the UE. Further, the UE may transition from the wake state associated with the low-power bandwidth part to a wake state associated with a high-power bandwidth part. In this way, the UE enables reduced power utilization relative to a single-stage wake up procedure. Some aspects, described herein enable cross-slot scheduling for multiple bandwidth parts. For example, the UE may receive a first control channel message in a first slot that schedules for a second slot, thereby enabling increased utilization of a microsleep mode within slots relative to non-cross-slot scheduling techniques, thereby reducing power utilization.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based at least in part on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, etc. (collectively referred to as "elements"). These elements may be implemented using hardware, software, or combinations thereof. Whether such elements are implemented as hardware or software depends upon the particular application and design constraints imposed on the overall system.

It is noted that while aspects may be described herein using terminology commonly associated with 3G and/or 4G wireless technologies, aspects of the present disclosure can be applied in other generation-based communication systems, such as 5G and later, including NR technologies.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, etc.

Wireless network 100 may be a heterogeneous network that includes BSs of different types, e.g., macro BSs, pico BSs, femto BSs, relay BSs, etc. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, etc. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, such as sensors, meters, monitors, location tags, etc., that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

In some examples, access to the air interface may be scheduled, wherein a scheduling entity (e.g., a base station) allocates resources for communication among some or all devices and equipment within the scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

In some aspects, a UE 120 may communicate with a base station 110 using a bandwidth part of a plurality of bandwidth parts. For example, the base station 110 may allocate a first portion of resources of a first bandwidth part to a first UE 120 and a second portion of resources of a second bandwidth part to a second UE 120. The base station 110 may provide dynamic signaling, such as via a DCI message, to trigger the UE 120 to transfer bandwidth parts, and may use the DCI message to provide wake-up signaling for the UE 120.

As indicated above, FIG. 1 is provided merely as an example. Other examples are possible and may differ from what was described with regard to FIG. 1.

Figure 2:
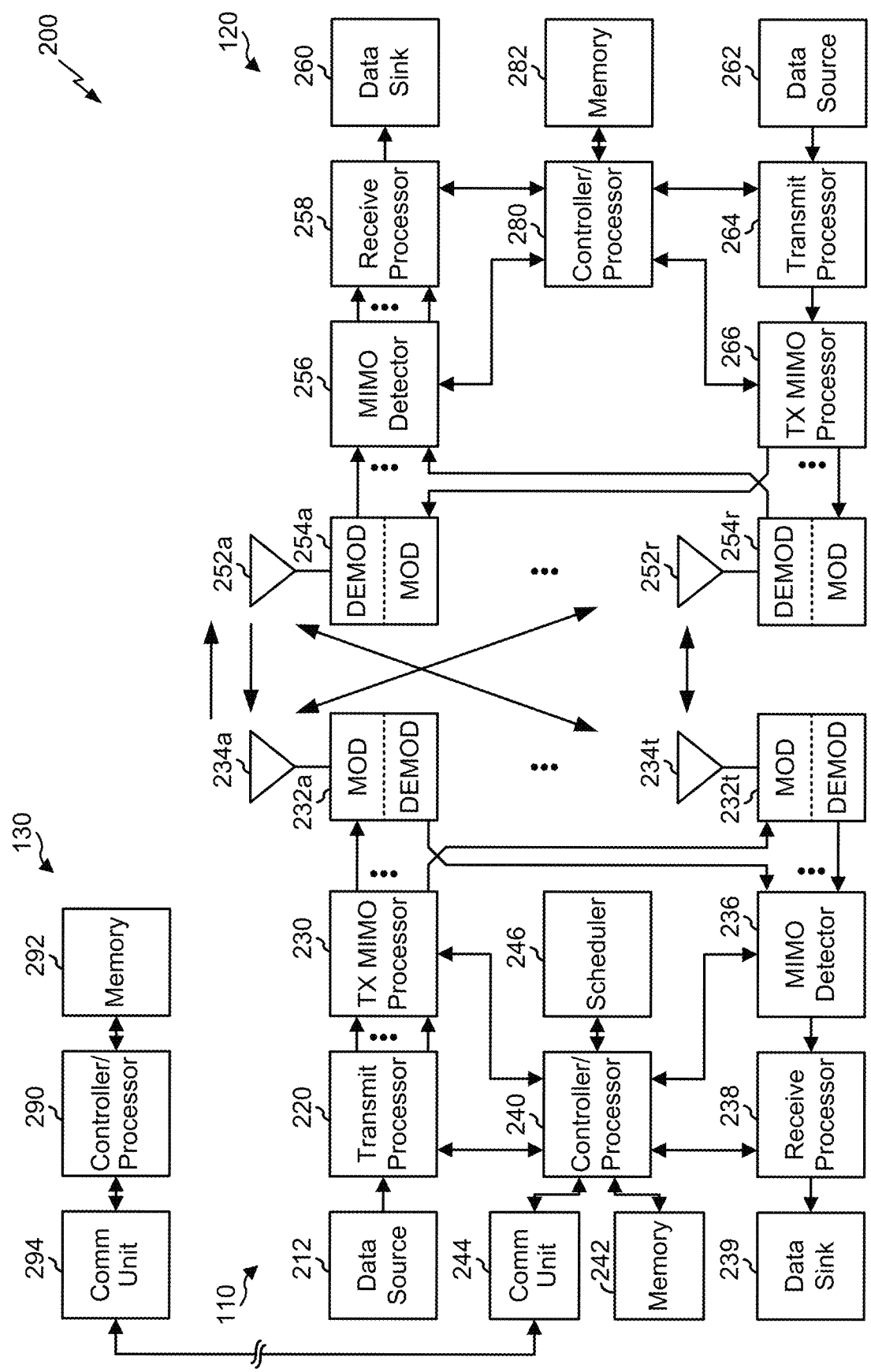
FIG. 2 is a block diagram conceptually illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1. In some aspects, one or more components of UE 120 may be included in a housing.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI), etc.) and control information (e.g., CQI requests, grants, upper layer signaling, etc.) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110, such as based at least in part on monitoring a bandwidth part of a plurality of bandwidth parts, and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), etc.

On the uplink, at UE 120, a transmit processor 264 may receive and process data from a data source 262 and control information (e.g., for reports comprising RSRP, RSSI, RSRQ, CQI, etc.) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, etc.), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with bandwidth part wake-up signaling, as described in more detail elsewhere herein. For example, controller/processor 240 of base station 110, controller/processor 280 of UE 120, and/or any other component(s) of FIG. 2 may perform or direct operations of, for example, process 1100 of FIG. 11, process 1700 of FIG. 17, process 2100 of FIG. 21, and/or other processes as described herein. Memories 242 and 282 may store data and program codes for base station 110 and UE 120, respectively. A scheduler 246 may schedule UEs for data transmission on the downlink and/or uplink.

In some aspects, UE 120 may include means for monitoring, in a first bandwidth part, of a plurality of bandwidth parts, associated with a first set of timing parameters and in a downlink control channel, for a downlink control information (DCI) message, means for selectively transitioning, based at least in part on the DCI message, from the first bandwidth part to a second bandwidth part, of the plurality of bandwidth parts, associated with a second set of timing parameters that is different than the first set of timing parameters, and/or the like. In some aspects, such means may include one or more components of UE 120 described in connection with FIG. 2.

In some aspects, UE 120 may include means for monitoring, in a first bandwidth part, of a plurality of bandwidth parts, associated with a first monitoring periodicity and in a downlink control channel, for a downlink control information (DCI) message, wherein the DCI message includes bandwidth part activation information or bandwidth part activation information and a downlink grant, wherein the DCI is a user equipment-specific, bandwidth part-specific DCI, means for selectively transitioning, based at least in part on the DCI message, from the first bandwidth part to a second bandwidth part, of the plurality of bandwidth parts, associated with a second monitoring periodicity that is less than the first monitoring periodicity, and/or the like. In some aspects, such means may include one or more components of UE 120 described in connection with FIG. 2.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided merely as an example. Other examples are possible and may differ from what was described with regard to FIG. 2.

Figure 3A:
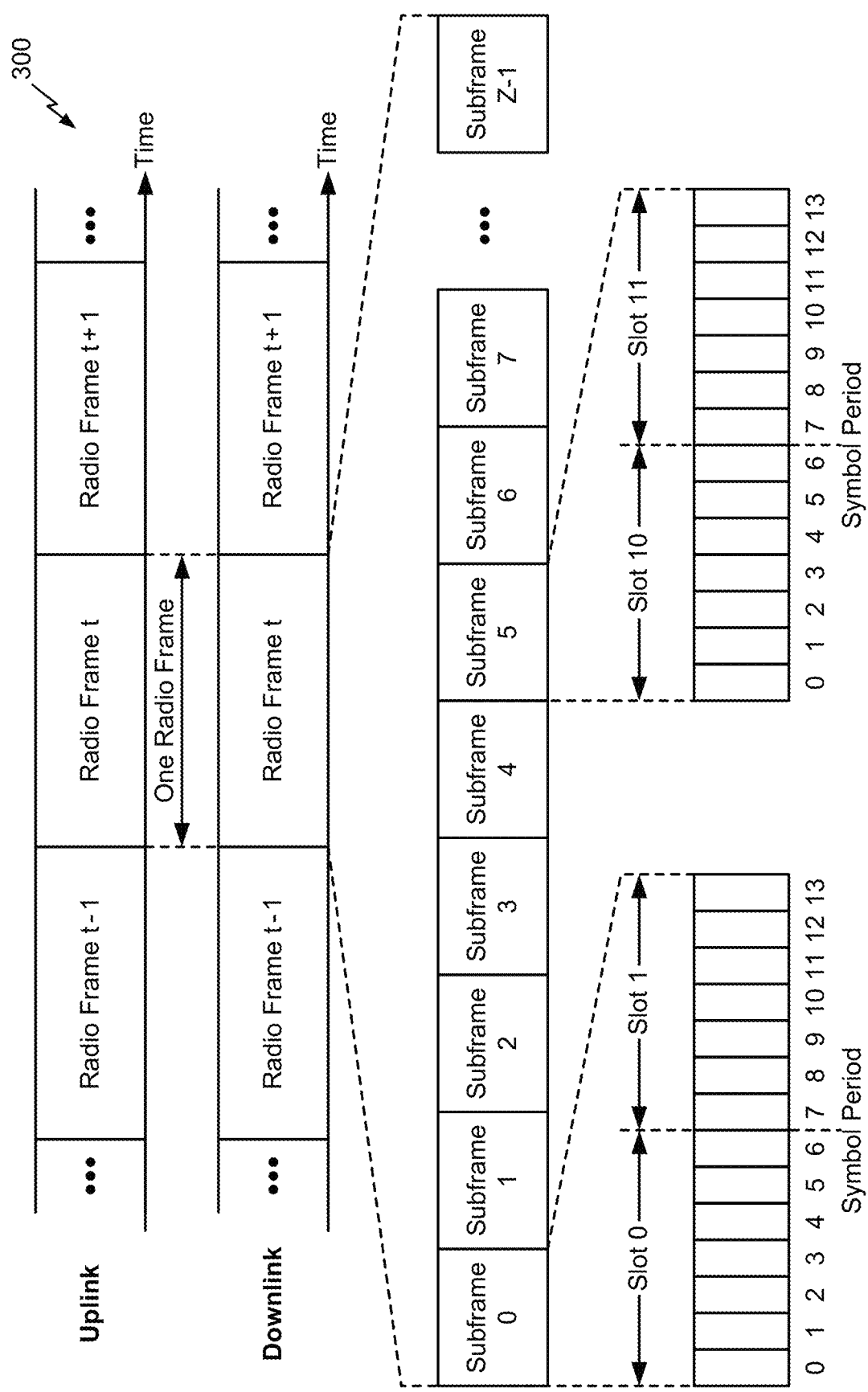
FIG. 3A is a block diagram conceptually illustrating an example of a frame structure in a wireless communication network, in accordance with various aspects of the present disclosure.

FIG. 3A shows an example frame structure 300 for FDD in a telecommunications system (e.g., NR). The transmission timeline for each of the downlink and uplink may be partitioned into units of radio frames. Each radio frame may have a predetermined duration and may be partitions into a set of Z (Z≥1) subframes (e.g., with indices of 0 through Z−1). Each subframe may include a set of slots (e.g., two slots per subframe are shown in FIG. 3A). Each slot may include a set of L symbol periods. For example, each slot may include seven symbol periods (e.g., as shown in FIG. 3A), fifteen symbol periods, and/or the like. In a case where the subframe includes two slots, the subframe may include 2L symbol periods, where the 2L symbol periods in each subframe may be assigned indices of 0 through 2L−1. In some aspects, a scheduling unit for the FDD may frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
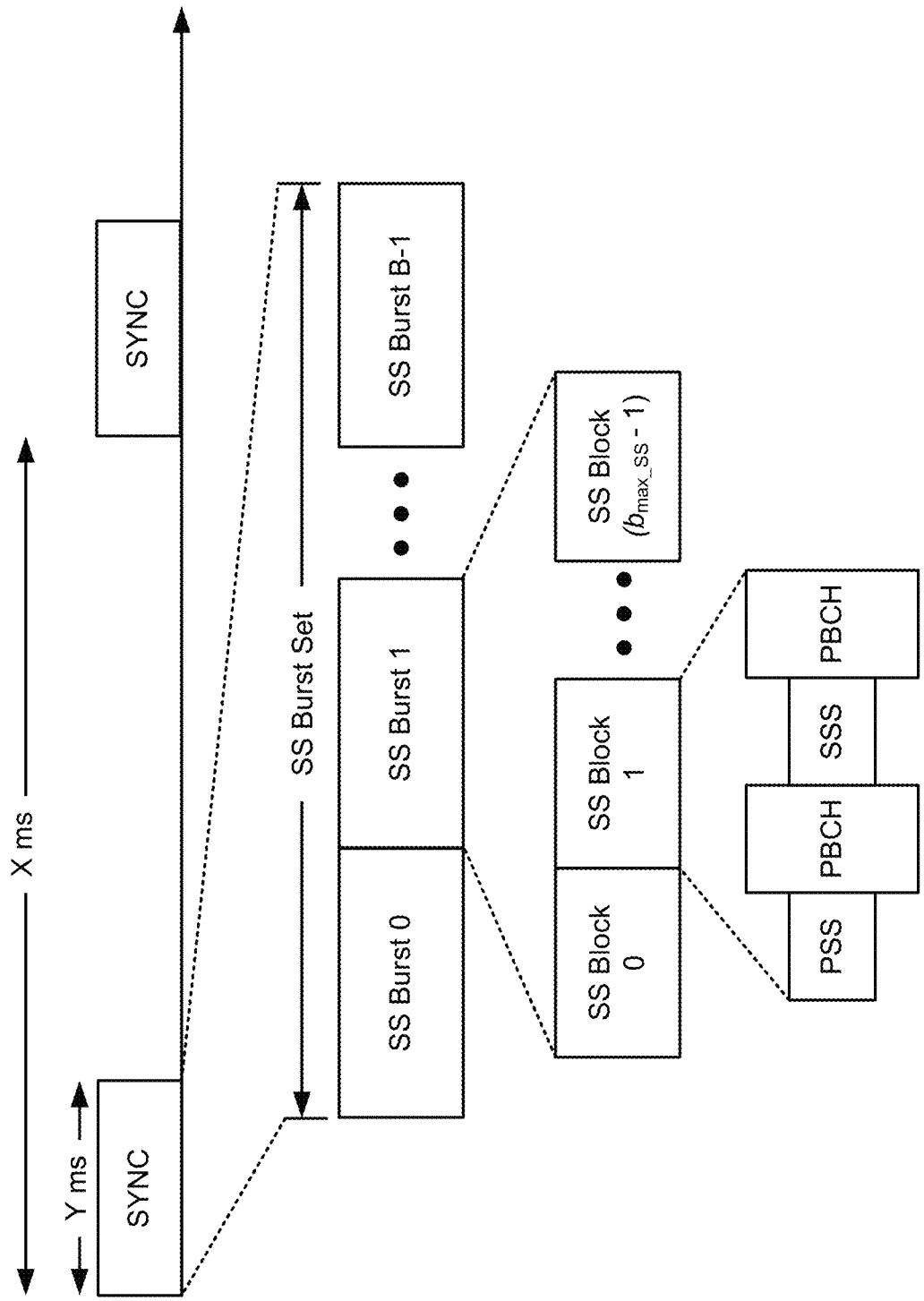
FIG. 3B is a block diagram conceptually illustrating an example synchronization communication hierarchy in a wireless communication network, in accordance with various aspects of the present disclosure.

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B−1, where B is a maximum number of repetitions of the SS burst that may be transmitted by the base station). As further shown, each SS burst may include one or more SS blocks (identified as SS block 0 through SS block ($b_{max\_SS-1}$), where $b_{max\_SS-1}$ is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, a synchronization communication (e.g., an SS block) may include a base station synchronization communication for transmission, which may be referred to as a Tx BS-SS, a Tx gNB-SS, and/or the like. In some aspects, a synchronization communication (e.g., an SS block) may include a base station synchronization communication for reception, which may be referred to as an Rx BS-SS, an Rx gNB-SS, and/or the like. In some aspects, a synchronization communication (e.g., an SS block) may include a user equipment synchronization communication for transmission, which may be referred to as a Tx UE-SS, a Tx NR-SS, and/or the like. A base station synchronization communication (e.g., for transmission by a first base station and reception by a second base station) may be configured for synchronization between base stations, and a user equipment synchronization communication (e.g., for transmission by a base station and reception by a user equipment) may be configured for synchronization between a base station and a user equipment.

In some aspects, a base station synchronization communication may include different information than a user equipment synchronization communication. For example, one or more base stations synchronization communications may exclude PBCH communications. Additionally, or alternatively, a base station synchronization communication and a user equipment synchronization communication may differ with respect to one or more of a time resource used for transmission or reception of the synchronization communication, a frequency resource used for transmission or reception of the synchronization communication, a periodicity of the synchronization communication, a waveform of the synchronization communication, a beamforming parameter used for transmission or reception of the synchronization communication, and/or the like.

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more subframes. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain subframes. The base station may transmit control information/data on a physical downlink control channel (PDCCH) in C symbol periods of a subframe, where B may be configurable for each subframe. For example, the base station may transmit a DCI message including a bandwidth part activation or deactivation to trigger a UE to transfer bandwidth parts and/or including wake-up signaling for a UE operating in a DRX mode. The base station may transmit traffic data and/or other data on the PDSCH in the remaining symbol periods of each subframe.

As indicated above, FIGS. 3A and 3B are provided as examples. Other examples are possible and may differ from what was described with regard to FIGS. 3A and 3B.

Figure 4:
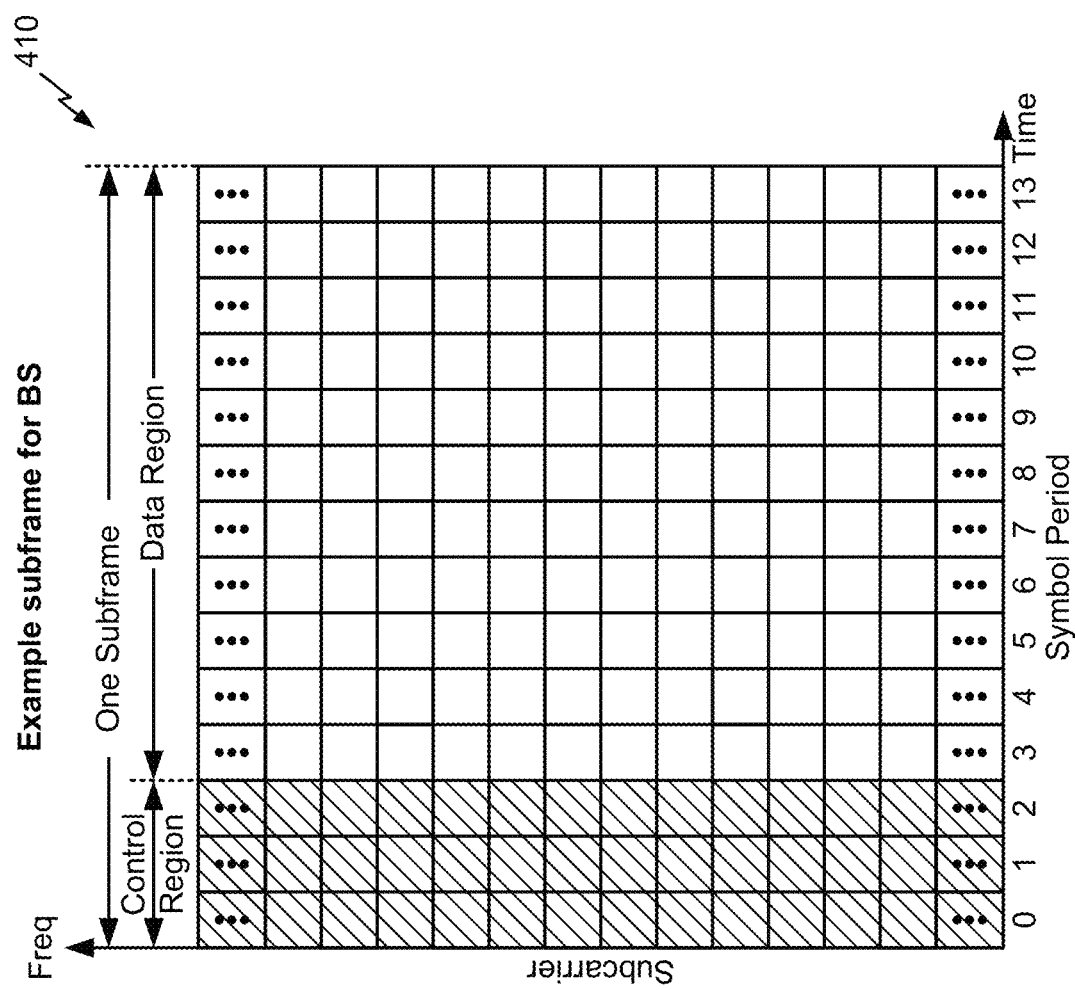
FIG. 4 is a block diagram conceptually illustrating an example subframe format with a normal cyclic prefix, in accordance with various aspects of the present disclosure.

FIG. 4 shows an example subframe format 410 with a normal cyclic prefix. The available time frequency resources may be partitioned into resource blocks. Each resource block may cover a set to of subcarriers (e.g., 12 subcarriers) in one slot and may include a number of resource elements. Each resource element may cover one subcarrier in one symbol period (e.g., in time) and may be used to send one modulation symbol, which may be a real or complex value. In some aspects, subframe format 410 may be used for transmission of SS blocks that carry the PSS, the SSS, the PBCH, and/or the like, as described herein.

An interlace structure may be used for each of the downlink and uplink for FDD in certain telecommunications systems (e.g., NR). For example, Q interlaces with indices of 0 through Q−1 may be defined, where Q may be equal to 4, 6, 8, 10, or some other value. Each interlace may include subframes that are spaced apart by Q frames. In particular, interlace q may include subframes q, q+Q, q+2Q, etc., where q E {0, . . . , Q−1}.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using TDD. In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

In some aspects, a single component carrier bandwidth of 100 MHZ may be supported. NR resource blocks may span 12 sub-carriers with a sub-carrier bandwidth of 60 or 120 kilohertz (kHz) over a 0.1 millisecond (ms) duration. Each radio frame may include 40 subframes with a length of 10 ms. Consequently, each subframe may have a length of 0.25 ms. Each subframe may indicate a link direction (e.g., DL or UL) for data transmission and the link direction for each subframe may be dynamically switched. Each subframe may include DL/UL data as well as DL/UL control data. In some aspects, bandwidth resources may be divided into bandwidth parts, and a UE may use a single bandwidth part to communicate with a base station.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units or distributed units.

As indicated above, FIG. 4 is provided as an example. Other examples are possible and may differ from what was described with regard to FIG. 4.

Figure 5:
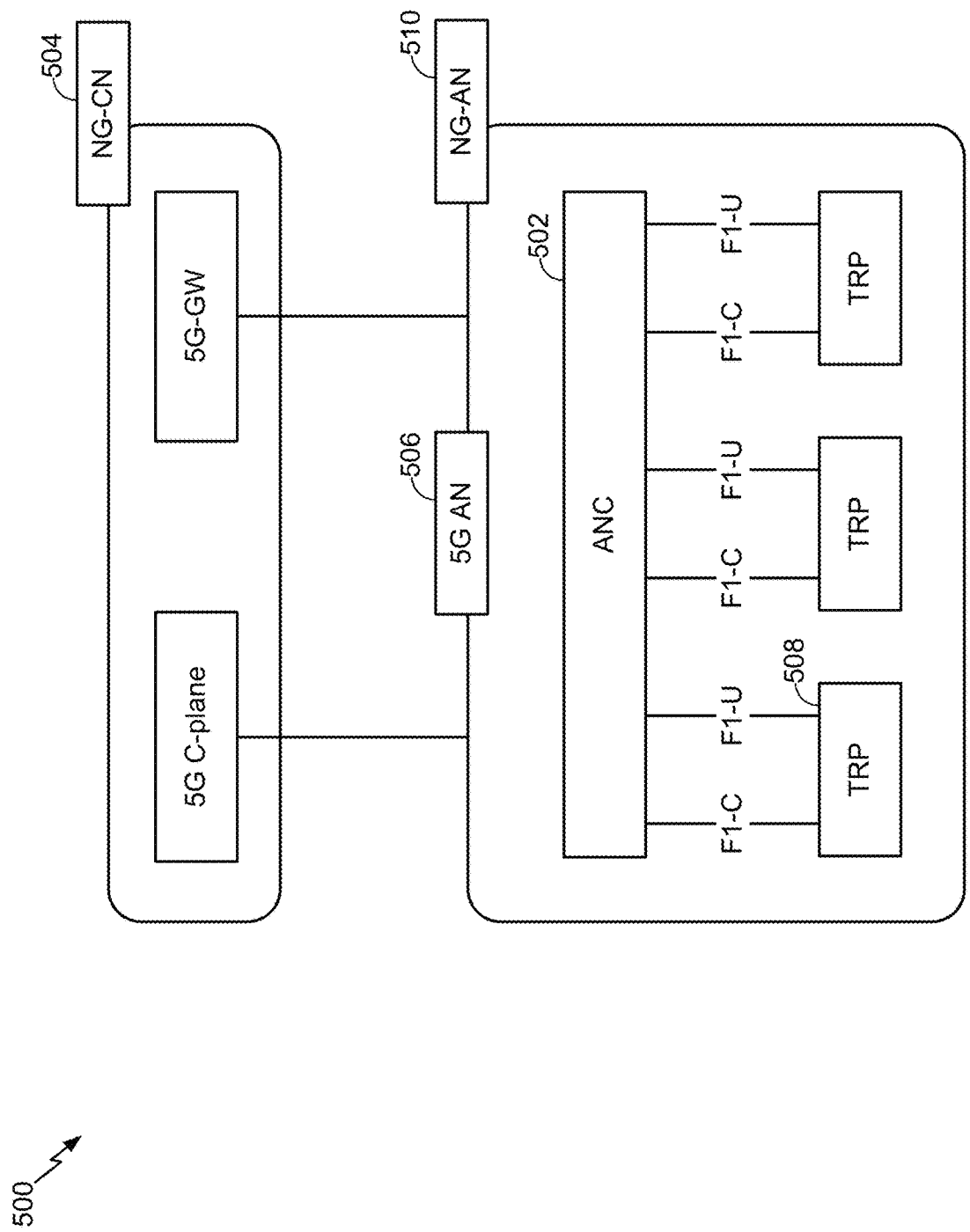
FIG. 5 illustrates an example logical architecture of a distributed radio access network (RAN), in accordance with various aspects of the present disclosure.

FIG. 5 illustrates an example logical architecture of a distributed RAN 500, according to aspects of the present disclosure. A 5G access node 506 may include an access node controller (ANC) 502. The ANC may be a central unit (CU) of the distributed RAN 500. The backhaul interface to the next generation core network (NG-CN) 504 may terminate at the ANC. The backhaul interface to neighboring next generation access nodes (NG-ANs) may terminate at the ANC. The ANC may include one or more TRPs 508 (which may also be referred to as BSs, NR BSs, Node Bs, 5G NBs, APs, gNB, or some other term). As described above, a TRP may be used interchangeably with "cell."

The TRPs 508 may be a distributed unit (DU). The TRPs may be connected to one ANC (ANC 502) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of RAN 500 may be used to illustrate fronthaul definition. The architecture may be defined that support fronthauling solutions across different deployment types. For example, the architecture may be based at least in part on transmit network capabilities (e.g., bandwidth, latency, and/or jitter).

The architecture may share features and/or components with LTE. According to aspects, the next generation AN (NG-AN) 510 may support dual connectivity with NR. The NG-AN may share a common fronthaul for LTE and NR.

The architecture may enable cooperation between and among TRPs 508. For example, cooperation may be preset within a TRP and/or across TRPs via the ANC 502. According to aspects, no inter-TRP interface may be needed/present.

According to aspects, a dynamic configuration of split logical functions may be present within the architecture of RAN 500. The packet data convergence protocol (PDCP), radio link control (RLC), media access control (MAC) protocol may be adaptably placed at the ANC or TRP.

According to various aspects, a BS may include a central unit (CU) (e.g., ANC 502) and/or one or more distributed units (e.g., one or more TRPs 508).

As indicated above, FIG. 5 is provided merely as an example. Other examples are possible and may differ from what was described with regard to FIG. 5.

Figure 6:
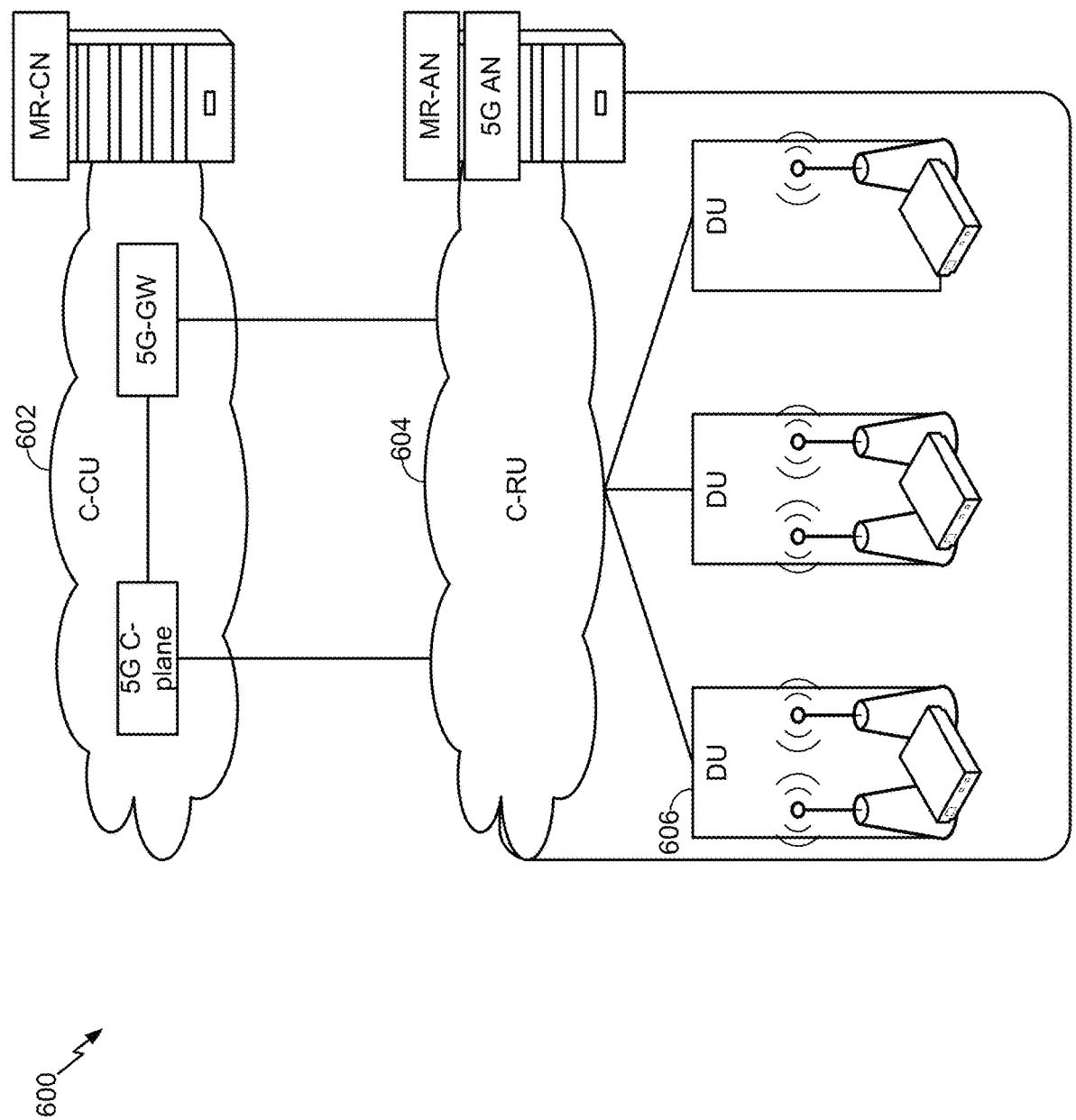
FIG. 6 illustrates an example physical architecture of a distributed RAN, in accordance with various aspects of the present disclosure.

FIG. 6 illustrates an example physical architecture of a distributed RAN 600, according to aspects of the present disclosure. A centralized core network unit (C-CU) 602 may host core network functions. The C-CU may be centrally deployed. C-CU functionality may be offloaded (e.g., to advanced wireless services (AWS)), in an effort to handle peak capacity.

A centralized RAN unit (C-RU) 604 may host one or more ANC functions. Optionally, the C-RU may host core network functions locally. The C-RU may have distributed deployment. The C-RU may be closer to the network edge.

A distributed unit (DU) 606 may host one or more TRPs. The DU may be located at edges of the network with radio frequency (RF) functionality.

As indicated above, FIG. 6 is provided merely as an example. Other examples are possible and may differ from what was described with regard to FIG. 6.

FIG. 7 is a diagram 700 showing an example of a DL-centric subframe or wireless communication structure. The DL-centric subframe may include a control portion 702. The control portion 702 may exist in the initial or beginning portion of the DL-centric subframe. The control portion 702 may include various scheduling information and/or control information corresponding to various portions of the DL-centric subframe. For example, the control portion 702 may be utilized for a DCI message including bandwidth part activation information and wake-up signaling for a UE. In some configurations, the control portion 702 may be a physical DL control channel (PDCCH), as indicated in FIG. 7. In some aspects, the control portion 702 may include legacy PDCCH information, shortened PDCCH (sPDCCH) information), a control format indicator (CFI) value (e.g., carried on a physical control format indicator channel (PC-FICH)), one or more grants (e.g., downlink grants, uplink grants, etc.), and/or the like.

The DL-centric subframe may also include a DL data portion 704. The DL data portion 704 may sometimes be referred to as the payload of the DL-centric subframe. The DL data portion 704 may include the communication resources utilized to communicate DL data from the scheduling entity (e.g., UE or BS) to the subordinate entity (e.g., UE). In some configurations, the DL data portion 704 may be a physical DL shared channel (PDSCH).

The DL-centric subframe may also include an UL short burst portion 706. The UL short burst portion 706 may sometimes be referred to as an UL burst, an UL burst portion, a common UL burst, a short burst, an UL short burst, a common UL short burst, a common UL short burst portion, and/or various other suitable terms. In some aspects, the UL short burst portion 706 may include one or more reference signals. Additionally, or alternatively, the UL short burst portion 706 may include feedback information corresponding to various other portions of the DL-centric subframe. For example, the UL short burst portion 706 may include feedback information corresponding to the control portion 702 and/or the data portion 704. Non-limiting examples of information that may be included in the UL short burst portion 706 include an ACK signal (e.g., a PUCCH ACK, a PUSCH ACK, an immediate ACK), a NACK signal (e.g., a PUCCH NACK, a PUSCH NACK, an immediate NACK), a scheduling request (SR), a buffer status report (BSR), a HARQ indicator, a channel state indication (CSI), a channel quality indicator (CQI), a sounding reference signal (SRS), a demodulation reference signal (DMRS), PUSCH data, and/or various other suitable types of information. The UL short burst portion 706 may include additional or alternative information, such as information pertaining to random access channel (RACH) procedures, scheduling requests, and various other suitable types of information.

As illustrated in FIG. 7, the end of the DL data portion 704 may be separated in time from the beginning of the UL short burst portion 706. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). The foregoing is merely one example of a DL-centric wireless communication structure, and alternative structures having similar features may exist without necessarily deviating from the aspects described herein.

As indicated above, FIG. 7 is provided merely as an example. Other examples are possible and may differ from what was described with regard to FIG. 7.

FIG. 8 is a diagram 800 showing an example of an UL-centric subframe or wireless communication structure. The UL-centric subframe may include a control portion 802.

The control portion 802 may exist in the initial or beginning portion of the UL-centric subframe. The control portion 802 in FIG. 8 may be similar to the control portion 702 described above with reference to FIG. 7. The UL-centric subframe may also include an UL long burst portion 804. The UL long burst portion 804 may sometimes be referred to as the payload of the UL-centric subframe. The UL portion may refer to the communication resources utilized to communicate UL data from the subordinate entity (e.g., UE) to the scheduling entity (e.g., UE or BS). In some configurations, the control portion 802 may be a physical DL control channel (PDCCH).

As illustrated in FIG. 8, the end of the control portion 802 may be separated in time from the beginning of the UL long burst portion 804. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity).

The UL-centric subframe may also include an UL short burst portion 806. The UL short burst portion 806 in FIG. 8 may be similar to the UL short burst portion 706 described above with reference to FIG. 7, and may include any of the information described above in connection with FIG. 7. The foregoing is merely one example of an UL-centric wireless communication structure, and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

In one example, a wireless communication structure, such as a frame, may include both UL-centric subframes and DL-centric subframes. In this example, the ratio of UL-centric subframes to DL-centric subframes in a frame may be dynamically adjusted based at least in part on the amount of UL data and the amount of DL data that are transmitted. For example, if there is more UL data, then the ratio of UL-centric subframes to DL-centric subframes may be increased. Conversely, if there is more DL data, then the ratio of UL-centric subframes to DL-centric subframes may be decreased.

As indicated above, FIG. 8 is provided merely as an example. Other examples are possible and may differ from what was described with regard to FIG. 8.

Figure 9:
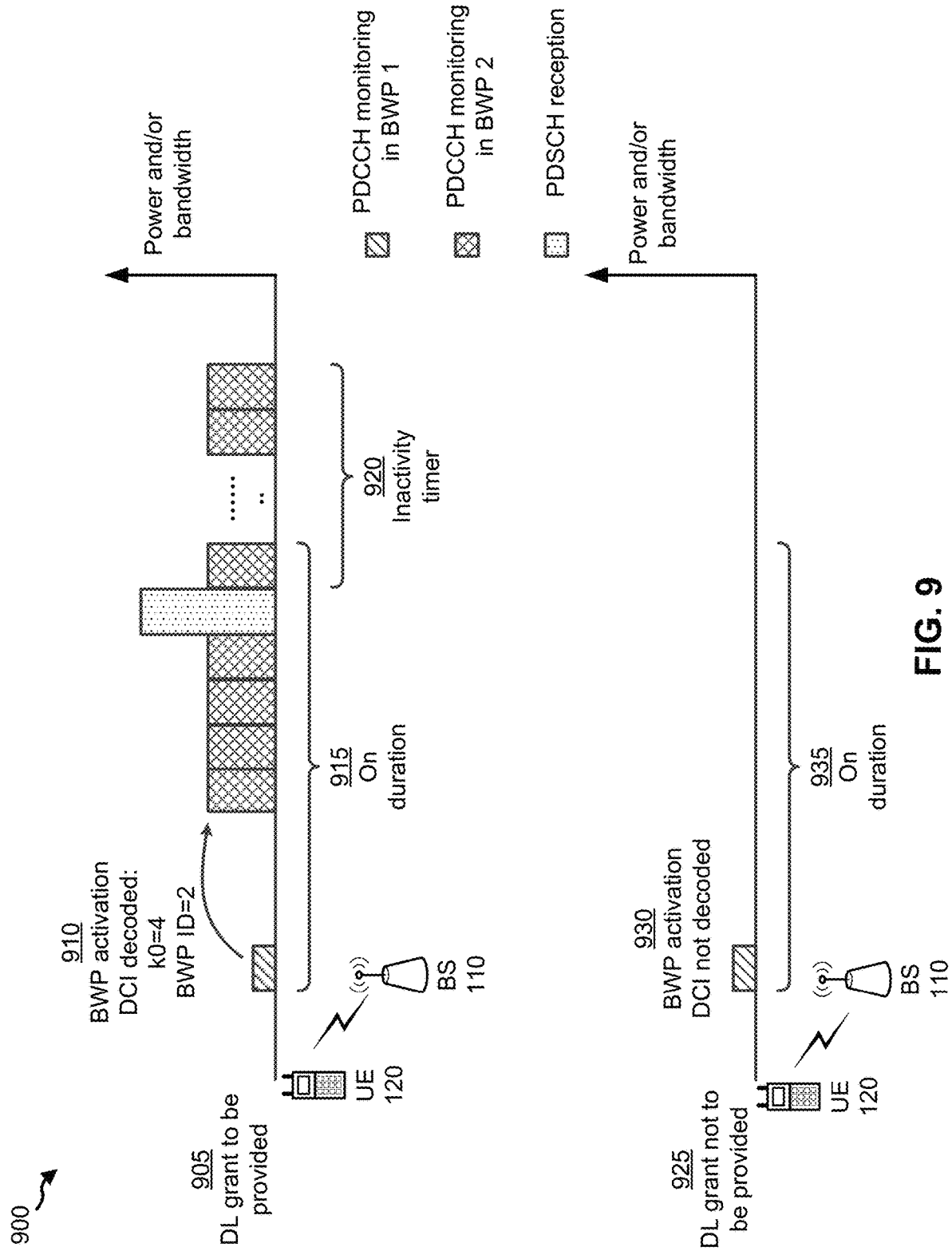
FIGS. 9-10 are diagrams illustrating examples of bandwidth part wake-up signaling, in accordance with various aspects of the present disclosure.

FIG. 9 is a diagram illustrating an example 900 of bandwidth part wake-up signaling, in accordance with various aspects of the present disclosure. As shown in FIG. 9, example 900 includes a UE 120 communicating with a BS 110 using a set of two bandwidth parts.

As further shown in FIG. 9, and by reference number 905, in a first scenario, a downlink grant may be provided for UE 120. For example, BS 110 may determine that a downlink grant is to be provided to UE 120 during a first DRX cycle period to enable UE 120 to receive queued data from BS 110 during the DRX cycle period. As shown by reference number 910, during the first DRX cycle period, UE 120 may monitor a downlink channel to receive a DCI message. In some aspects, the UE 120 may monitor the downlink channel (e.g., a PDCCH) in a low-power mode. For example, for a set of bandwidth parts that includes a first bandwidth part associated with a first periodicity and a second bandwidth part associated with a second periodicity that is less than the first periodicity, UE 120 may monitor the first bandwidth part in the low-power mode.

In this case, UE 120 receives the downlink channel and decodes the downlink channel to determine the DCI message. For example, the UE 120 may determine that the DCI message, which may be a UE-specific, bandwidth part-specific DCI message, includes bandwidth activation information indicating that UE 120 is to transition from monitoring in a first bandwidth part to monitoring in a second bandwidth part (e.g., BWP ID=2). Additionally, or alternatively, UE 120 may determine that the DCI message includes timing information (e.g., indicated as k0=4, which may indicate that a grant, if included in the DCI message, is to apply in 4 slots). In some aspects, the timing information may identify a size of a gap period between the DCI message and a grant transmission. For example, the timing information may indicate a transition time of 4 slots (e.g., k0=4) from the DCI message for UE 120 to transition to the second bandwidth part and monitor for a downlink channel on the second bandwidth part. In some aspects, the size of the gap period may be greater than a transition time to a higher performance state for the modem of UE 120. In some aspects, a periodicity of the first monitoring period is greater than the size of the gap between the DCI message and the grant transmission and/or greater than an on duration for the downlink channel. In this way, UE 120 can monitor the downlink channel once in each DRX cycle without failing to receive a communication.

In some aspects, the size of the gap may be semi-statically configured. In this way, BS 110 may ensure a threshold ramp-up period for a modem of UE 120. In some aspects, BS 110 may not schedule data on the first bandwidth part, and may include a gap period to enable a transition from the first bandwidth part to the second bandwidth part by UE 120. In this way, BS 110 may enable UE 120 to utilize a reduced bandwidth of the first bandwidth part (relative to a bandwidth of the second bandwidth part) to determine that a data transmission is to occur, and to transition to the increased bandwidth of the second bandwidth part to receive the data transmission, thereby enabling a more efficient allocation of network resources.

In some aspects, the DCI message may include a downlink grant with the bandwidth part activation information. In some aspects, based at least in part on determining the DCI message and during on duration 915, UE 120 may ramp up a modem from a first power mode to a second power mode. For example, UE 120 may transition from the low-power mode to a high-power mode. In some aspects, UE 120 may transition bandwidth parts. For example, UE 120 may transition from the first bandwidth part to the second bandwidth part based at least in part on the DCI message. In some aspects, UE 120 may monitor for a downlink control channel (e.g., a PDCCH) on the second bandwidth part. In some aspects, UE 120 may receive a downlink shared channel (e.g., a physical downlink shared channel (PDSCH)) on the second bandwidth part based at least in part on receiving the DCI message. In some aspects, UE 120 may activate an inactivity timer 920 associated with a DRX cycle after an on duration.

As shown by reference number 925, in a second scenario, a downlink grant may not be provided for UE 120. For example, BS 110 may determine that a downlink grant is not to be provided to UE 120 during a second DRX cycle period (e.g., based at least in part on BS 110 not having data queued for transmission to UE 120). As shown by reference number 930, during the second DRX cycle period, UE 120 may monitor a downlink channel to receive a DCI message, and may fail to decode the downlink channel to receive the DCI message. In this case, UE 120 may not transition from the first bandwidth part to the second bandwidth part based at least in part on failing to decode the downlink channel. In some aspects, a monitoring periodicity of the downlink channel may be larger than on duration 935. For example, BS 110 may schedule a next downlink channel transmission for UE 120 after expiration of on duration 935. In this case, UE 120 may transition from a low-power mode (e.g., associated with monitoring for the downlink channel) to a sleep-mode (e.g., a lower power mode relative to the low-power mode), thereby conserving power resources.

As indicated above, FIG. 9 is provided as an example. Other examples are possible and may differ from what was described with respect to FIG. 9.

Figure 10:
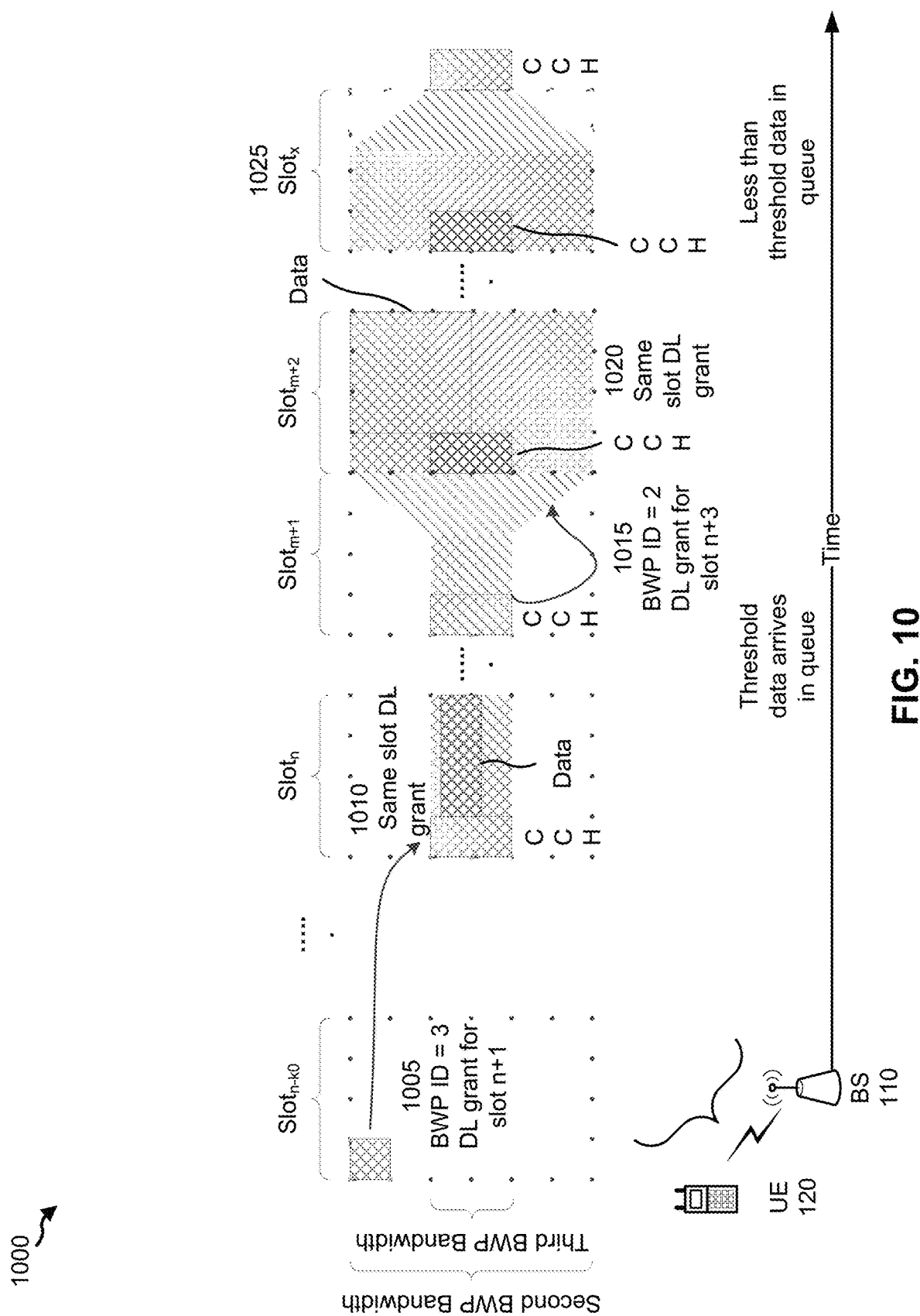

FIG. 10 is a diagram illustrating an example 1000 of bandwidth part wake-up signaling, in accordance with various aspects of the present disclosure. As shown in FIG. 10, example 1000 includes a UE 120 communicating with a BS 110 using a set of three or more bandwidth parts. In some aspects, the set of bandwidth parts may include a first bandwidth part with a first bandwidth, a second bandwidth part with a second bandwidth that is greater than the first bandwidth, and a third bandwidth part with a third bandwidth that is greater than the first bandwidth and less than the second bandwidth.

In some aspects, the scheduling timing configured for the three or more bandwidth parts can be different. For example, the scheduling timing may be configured at least semi-statically (e.g., based at least in part on setting the k0 parameter in a DCI message). In this case, the first bandwidth part may have k0 configured to 4 (slots); the second bandwidth part may have k0 configured to 0 (slots) (e.g., same slot scheduling); the third bandwidth part may have k0 configured to 1 (slot) (e.g., cross-slot scheduling); and/or the like. In this way, a network may enable reduction in power utilization by permitting different levels of cross-slot scheduling, which may enable power utilization savings, relative to other techniques, by allowing more time for processing and allowing the modem to operate at a lower voltage and a lower clock frequency.

In some aspects, UE 120 may transition between bandwidth parts based at least in part on a size of data that is to be transmitted. For example, as shown by reference number 1005 and in slot n–k0, UE 120 may monitor a downlink channel for a DCI message that includes information identifying a bandwidth part (e.g., the third bandwidth part selected by BS 110 based at least in part on determining that a size of data that is to be transmitted does not satisfy a threshold) to which to transition and a downlink grant (e.g., in a particular slot n+1). In this case, UE 120 may transition to the third bandwidth part during a ramp-up period from slot n–k0 to slot n, thereby enabling UE 120 to receive the data from BS 110. In another example, as shown by reference number 1010, rather than receiving a DCI triggering a bandwidth part transition, and which may include wake-up signaling, UE 120 may receive a downlink grant in a control channel (e.g., CCH) as a trigger to transition bandwidth parts in a same slot as the downlink grant is received.

Based at least in part on BS 110 receiving data that satisfies the threshold, and as shown by reference number 1015, BS 110 may provide and UE 120 may receive in a downlink channel another DCI message to trigger a transition from the third bandwidth part to the second bandwidth part (e.g., for data transmission in a particular slot n+3). In another example, as shown by reference number 1020, rather than receiving a DCI triggering a bandwidth part transition, UE 120 may receive a downlink grant in a control channel as a trigger to transition from the third bandwidth part to the second bandwidth part in a same slot as the downlink grant is received. As shown by reference number 1025, based at least in part on the data in a queue of BS 110 not satisfying the threshold, BS 110 may trigger UE 120 to transition from the second bandwidth part to the first bandwidth part or the third bandwidth part (e.g., using a DCI message or a downlink grant), thereby enabling BS 110 to provide the downlink data to UE 120 without UE 120 being allocated excessive resources of the second bandwidth part.

As indicated above, FIG. 10 is provided as an example. Other examples are possible and may differ from what was described with respect to FIG. 10.

Figure 11:
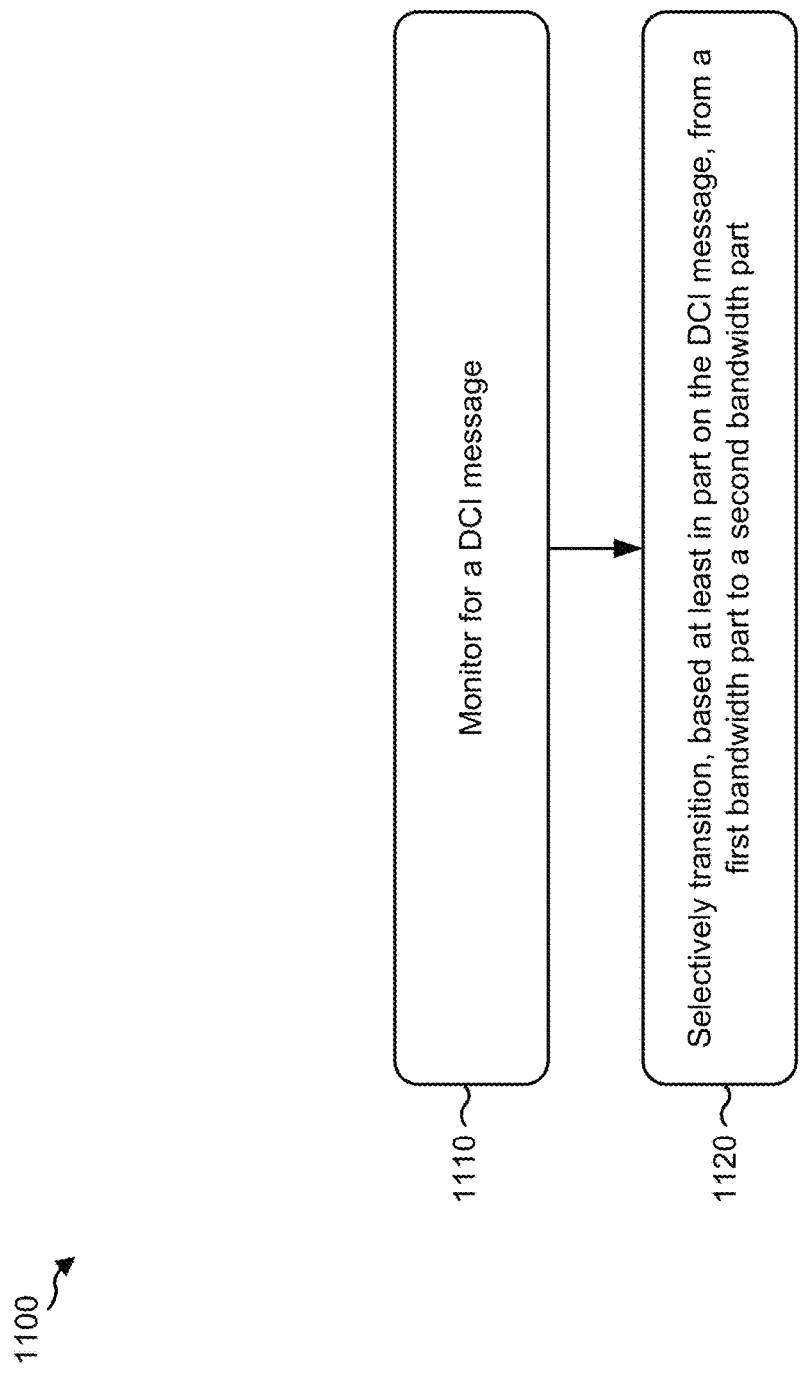
FIG. 11 is a diagram illustrating an example process performed, for example, by a user equipment, in accordance with various aspects of the present disclosure.

FIG. 11 is a diagram illustrating an example process 1100 performed, for example, by a UE, in accordance with various aspects of the present disclosure. Example process 1100 is an example where a UE (e.g., UE 120) performs bandwidth part wake-up signaling.

As shown in FIG. 11, in some aspects, process 1100 may include monitoring for a DCI message (block 1110). For example, the UE may monitor, in a first bandwidth part, of a plurality of bandwidth parts, associated with a first monitoring periodicity and in a downlink control channel, for the DCI message. In some aspects, the DCI message may include bandwidth part activation information or bandwidth part activation information and a downlink grant. In some aspects, the DCI message may be a user equipment-specific, bandwidth part-specific DCI message.

In some aspects, the DCI message identifies a size of a gap between the DCI message and a grant transmission. In some aspects, a size of a gap between the DCI message and a grant transmission is greater than a state transition time (e.g., a period of time to transition from a lower performance state, such as a low-power state, to a higher performance state, such as a high-power state) for a modem of the user equipment. In some aspects, the first monitoring periodicity is greater than a size of a gap between the DCI message and a grant transmission. In some aspects, the first monitoring periodicity is greater than an on duration of the user equipment. In some aspects, the DCI message is an activation or deactivation DCI message.

As shown in FIG. 11, in some aspects, process 1100 may include selectively transitioning, based at least in part on the DCI message, from a first bandwidth part to a second bandwidth part (block 1120). For example, the UE may selectively transition, based at least in part on the DCI message, from the first bandwidth part to a second bandwidth part, of the plurality of bandwidth parts, associated with a second monitoring periodicity that is less than the first monitoring periodicity.

In some aspects, the user equipment does not decode the downlink control channel in connection with monitoring the downlink control channel. In some aspects, selectively transitioning comprises forgoing transitioning to the second bandwidth part based at least in part on not decoding the downlink control channel. In some aspects, the user equipment transitions from a low-power mode to a sleep mode based at least in part on not decoding the downlink control channel. In some aspects, the user equipment is not scheduled for a discontinuous reception cycle that includes the monitoring.

In some aspects, the user equipment decodes the downlink control channel in connection with monitoring the downlink control channel. In some aspects, the user equipment transitions from a low-power mode to a high-power mode during a ramp-up period based at least in part on decoding the downlink control channel. In some aspects, selectively transitioning comprises transitioning to the second bandwidth part based at least in part on decoding the downlink control channel. In some aspects, the user equipment is scheduled for a discontinuous reception cycle that includes the monitoring.

In some aspects, data is scheduled on the second bandwidth part and not on the first bandwidth part. In some aspects, the DCI message includes information identifying a quantity of data for transmission using the downlink grant, the plurality of bandwidth parts includes three or more bandwidth parts, and the second bandwidth part is selected from the plurality of bandwidth parts based at least in part on the quantity of data for transmission using the downlink grant. In some aspects, a transition from the second bandwidth part to a third bandwidth part is signaled using another DCI message or another downlink grant message. In some aspects, the user equipment transitions from the first bandwidth part to the second bandwidth part in connection with activation of the second bandwidth part.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
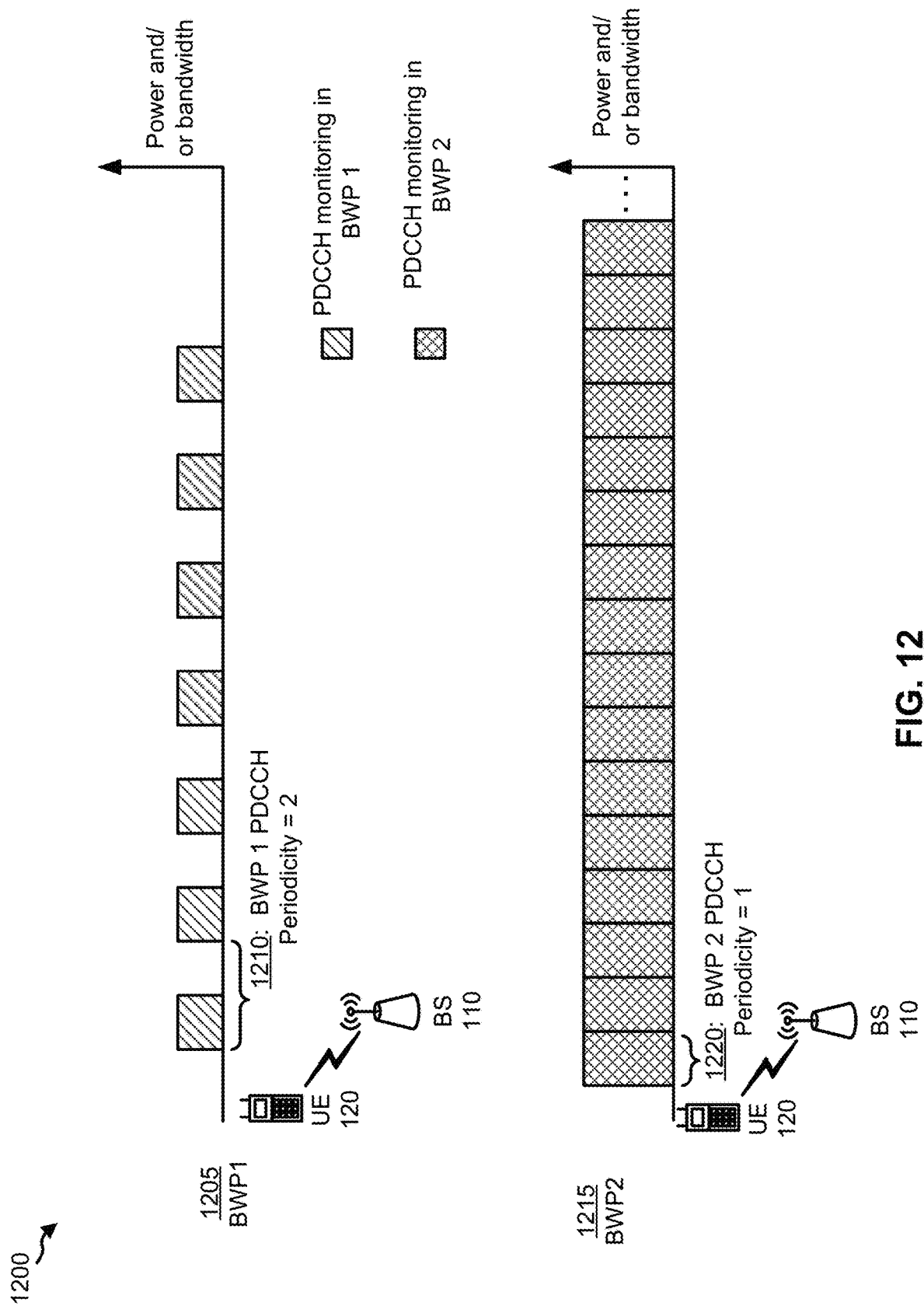
FIGS. 12-16 are diagrams illustrating examples relating to bandwidth part wake-up signaling, in accordance with various aspects of the present disclosure.

FIG. 12 is a diagram illustrating an example 1200 relating to bandwidth part wake-up signaling, in accordance with various aspects of the present disclosure. As shown in FIG. 12, example 1200 includes a UE 120 in communication with a BS 110 using a bandwidth part of a plurality of bandwidth parts.

As further shown in FIG. 12, and by reference number 1205, in a first scenario, UE 120 may be communication with BS 110 using a first bandwidth part (BWP1). In some aspects, the first bandwidth part may be associated with less than a threshold bandwidth and with greater than a threshold timing parameter. The timing parameter may identify a size of a gap period between a DCI message and a grant transmission. For example, the timing parameter for the first bandwidth part may indicate a transition time of 4 slots (e.g., k0=4) from the DCI message for UE 120 to transition to the second bandwidth part and monitor for a downlink channel on the second bandwidth part. As shown by reference number 1210, the first bandwidth part may be associated with a particular monitoring periodicity for a downlink control channel (e.g., Periodicity=2). For example, the first bandwidth part may be associated with monitoring for a DCI message in alternating slots of the first bandwidth part.

In some aspects, UE 120 may use the first bandwidth part when operating in a DRX mode. For example, UE 120 may use the first bandwidth part for relatively low amounts (e.g., less than a threshold amount) of data activity, and when a relatively high latency (e.g., greater than a threshold latency) may be acceptable. In some aspects, UE 120 may select, as the first bandwidth part to operate in after a DRX mode (e.g., a sleep mode), a default bandwidth part for a secondary cell and/or a primary cell, a bandwidth part active during a previous DRX cycle (e.g., a most recently active bandwidth part), a configured bandwidth part (e.g., a signaled bandwidth part for the primary cell, the secondary cell, and/or the like), a bandwidth part active at a start of an on duration, and/or the like.

As further shown in FIG. 12, and by reference number 1215, in a second scenario, UE 120 may communicate with BS 110 using a second bandwidth part (BWP2). In some aspects, the second bandwidth part may be associated with not less than the threshold bandwidth (e.g., greater than or equal to the threshold bandwidth) and not greater than the threshold timing parameter (e.g., less than or equal to the threshold timing parameter). For example, the timing parameter for the second bandwidth part may indicate a transition time of 0 slots or 1 slot (e.g., k0=0 or k0=1). As shown by reference number 1220, the second bandwidth part may be associated with another monitoring periodicity for the downlink control channel (e.g., Periodicity=1). For example, the second bandwidth part may be associated with monitoring for a DCI message in each slot of the second bandwidth part. In this case, UE 120 may implement a micro-sleep operation to reduce power consumption relative to other techniques for monitoring for the DCI message. For example, UE 120 may implement the microsleep operation when a value for k0 is set to 1.

In some aspects, UE 120 may use the second bandwidth part for relatively high amounts (e.g., not less than a threshold amount) of data activity. Additionally, or alternatively, UE 120 may use the second bandwidth part for relatively low latency levels (e.g., when not greater than a threshold amount of latency is acceptable).

In some aspects, periodicities for a plurality of bandwidth parts may be configured. For example, UE 120 may receive information (e.g., from BS 110) associated with configuring monitoring periodicities for the first bandwidth part, the second bandwidth part, and/or the like. In this case, the monitoring periodicities may be determined based at least in part on a data traffic pattern, a bandwidth, a user equipment capability (e.g., an energy resource availability) and/or the like. In some aspects, the monitoring periodicities may be selected based at least in part on a processing capability of UE 120. For example, a monitoring periodicity of greater than a threshold may be selected to enable a threshold amount of time for downlink channel processing. Additionally, or alternatively, UE 120 may receive information associated with configuring the timing parameter based at least in part on a data traffic pattern, a network characteristic, a user equipment capability, and/or the like.

As indicated above, FIG. 12 is provided as an example. Other examples are possible and may differ from what was described with respect to FIG. 12.

Figure 13:
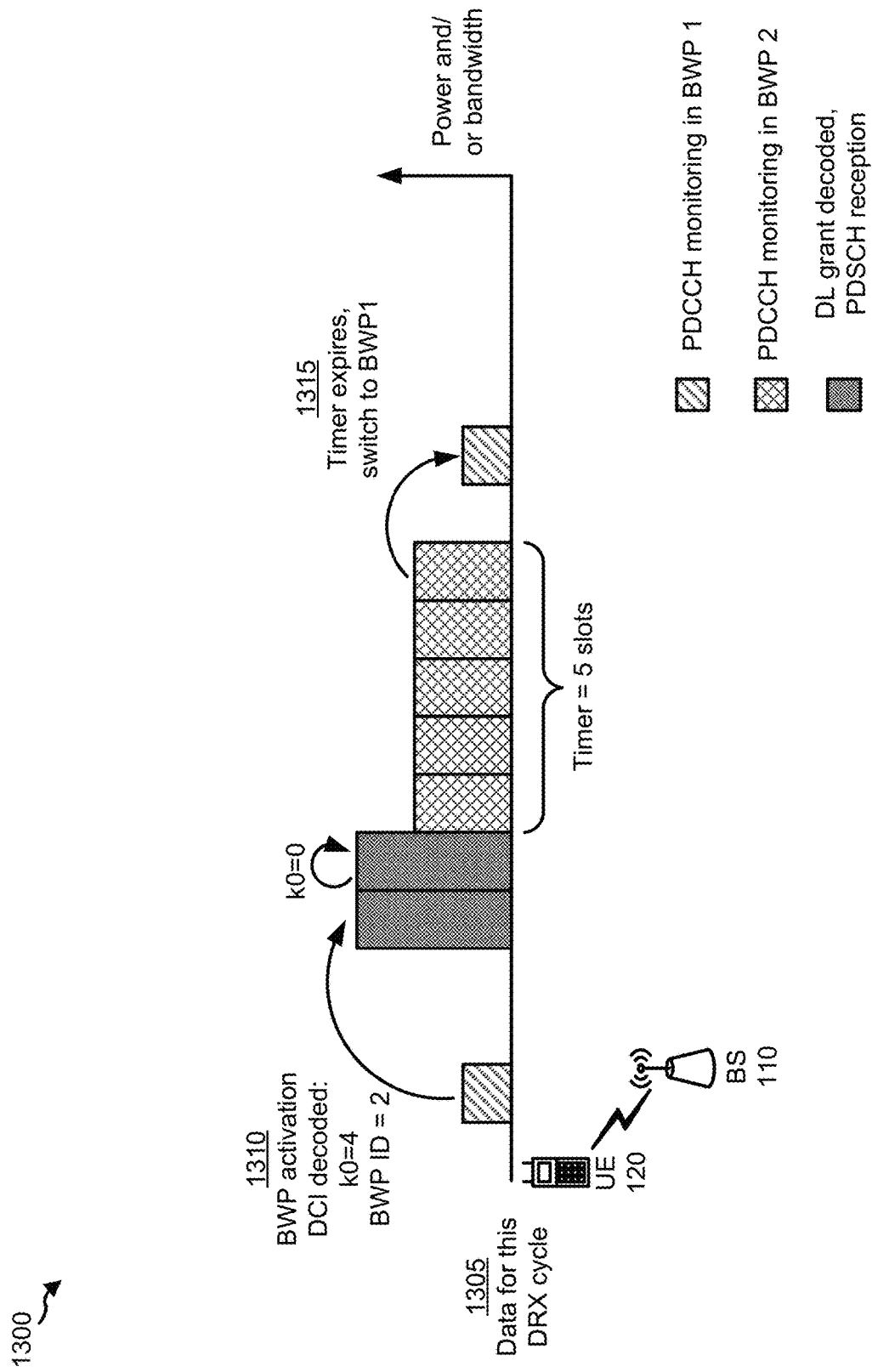

FIG. 13 is a diagram illustrating an example 1300 relating to bandwidth part wake-up signaling, in accordance with various aspects of the present disclosure. As shown in FIG. 13, example 1300 includes a UE 120 in communication with a BS 110 using a bandwidth part of a plurality of bandwidth parts.

As further shown in FIG. 13, and by reference number 1305, data activity may be scheduled for UE 120 during a particular DRX cycle. In this case, a downlink grant may be provided for UE 120 using a DCI message. For example, BS 110 may determine that the downlink grant is to be provided to UE 120 during a DRX cycle period to enable UE 120 to receive queued data from BS 110 during the DRX cycle period. As shown by reference number 1310, during the DRX cycle period, UE 120 may monitor a downlink channel to receive a DCI message conveying the downlink grant. In some aspects, the UE 120 may monitor the downlink channel (e.g., a PDCCH) in a low-power mode. For example, for a set of bandwidth parts that includes a first bandwidth part associated with a first periodicity and a second bandwidth part associated with a second periodicity that is less than the first periodicity, UE 120 may monitor the first bandwidth part in the low-power mode.

In this example, UE 120 receives the downlink channel and decodes the downlink channel to determine the DCI message. For example, the UE 120 may determine that the DCI message, which may be a UE-specific, bandwidth part-specific DCI message, includes bandwidth activation information indicating that UE 120 is to transition from monitoring in a first bandwidth part to monitoring in a second bandwidth part (e.g., BWP ID=2).

Additionally, or alternatively, UE 120 may determine that the DCI message includes timing information (e.g., indicated as k0=4, which may indicate that a grant, if included in the DCI message, is to apply in 4 slots). In some aspects, the timing information may identify a size of a gap period between the DCI message and a grant transmission. For example, the timing information may indicate a transition time of 4 slots (e.g., k0=4) from the DCI message for UE 120 to transition to the second bandwidth part and monitor for a downlink channel on the second bandwidth part. In some aspects, the size of the gap period may be greater than a transition time to a higher performance state for the modem of UE 120. In some aspects, a periodicity of the first monitoring period is greater than the size of the gap between the DCI message and the grant transmission and/or greater than an on duration for the downlink channel. In this way, UE 120 can monitor the downlink channel once in each DRX cycle without failing to receive a communication.

In some aspects, the size of the gap may be semi-statically configured. In this way, BS 110 may ensure a threshold ramp-up period for a modem of UE 120. In some aspects, BS 110 may not schedule data on the first bandwidth part, and may include a gap period to enable a transition from the first bandwidth part to the second bandwidth part by UE 120. In this way, BS 110 may enable UE 120 to utilize a reduced bandwidth of the first bandwidth part (relative to a bandwidth of the second bandwidth part) to determine that a data transmission is to occur, and to transition to the increased bandwidth of the second bandwidth part to receive the data transmission, thereby enabling a more efficient allocation of network resources.

In some aspects, based at least in part on determining the DCI message, UE 120 may ramp up a modem from a first power mode to a second power mode. For example, UE 120 may transition from the low-power mode to a high-power mode. In some aspects, UE 120 may receive a downlink shared channel (e.g., a physical downlink shared channel (PDSCH)) on the second bandwidth part based at least in part on receiving the DCI message, and may monitor for a DCI message on a downlink control channel on the second bandwidth part. In some aspects, UE 120 may activate a bandwidth part timer for a particular quantity of slots (e.g., Timer=5 slots). As shown by reference number 1315, based at least in part on expiration of the bandwidth part timer, UE 120 may transition to a default bandwidth part (e.g., the first bandwidth part) after not receiving another DCI message before expiration of the bandwidth part timer.

As indicated above, FIG. 13 is provided as an example. Other examples are possible and may differ from what was described with respect to FIG. 13.

Figure 14:
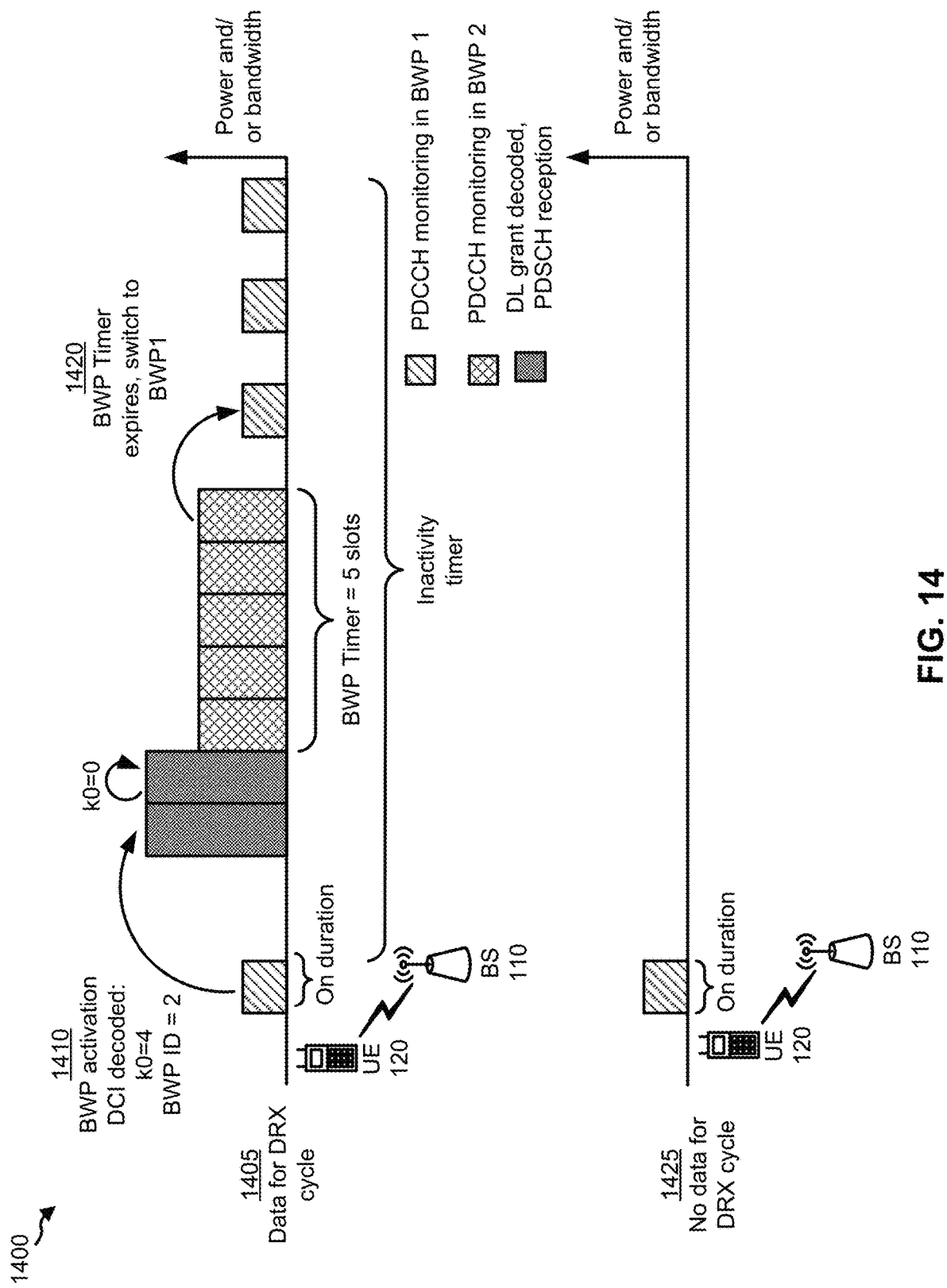

FIG. 14 is a diagram illustrating an example 1400 relating to bandwidth part wake-up signaling, in accordance with various aspects of the present disclosure. As shown in FIG. 14, example 1400 includes a UE 120 in communication with a BS 110 using a bandwidth part of a plurality of bandwidth parts.

As further shown in FIG. 14, and by reference number 1405, in a first scenario, a downlink grant may be provided for UE 120. For example, BS 110 may determine that a downlink grant is to be provided to UE 120 during a first DRX cycle period to enable UE 120 to receive queued data from BS 110 during the DRX cycle period. As shown by reference number 1410, during the first DRX cycle period, UE 120 may monitor a downlink channel to receive a DCI message. For example, the UE 120 may determine that the DCI message, which may be a UE-specific, bandwidth part-specific DCI message, includes bandwidth activation information indicating that UE 120 is to transition from monitoring in a first bandwidth part to monitoring in a second bandwidth part (e.g., BWP ID=2). Additionally, or alternatively, UE 120 may determine that the DCI message includes timing information (e.g., indicated as k0=4, which may indicate that a grant, if included in the DCI message, is to apply in 4 slots). In this case, UE 120 may transition from the first bandwidth part to the second bandwidth part in k0 slots. In some aspects, the timing information may be semi-statically configured. For example, k0 may be configured as a 3 millisecond time period to enable modem warm-up. In some aspects, an aggregation level for a PDCCH may be set for UE 120. For example, the aggregation level may be greater than a threshold (e.g., 8), thereby improving decoding reliability relative to a lower aggregation level.

In some aspects, based at least in part on determining the DCI message and during or after an on duration, UE 120 may ramp up a modem from a first power mode to a second power mode, and may transition bandwidth parts. In this case, UE 120 may receive a downlink shared channel (e.g., a PDSCH) on the second bandwidth part in a set of slots and based at least in part on receiving the DCI message. In some aspects, UE 120 may receive data on the first bandwidth part. For example, based at least in part on not switching to the second bandwidth part, UE 120 may receive data on the first bandwidth part after a configured delay associated with enabling a modem ramp up.

In some aspects, UE 120 may activate an inactivity timer, a bandwidth part timer, and/or the like associated with a DRX cycle after receiving the PDSCH. As shown by reference number 1420, based at least in part on expiration of the bandwidth part timer (e.g., after 5 slots), UE 120 may determine that the bandwidth part timer is expired and may switch to the first bandwidth part (e.g., a default bandwidth part). In this case, after expiration of the inactivity timer, UE 120 may determine to transfer to another DRX mode, such as a sleep mode.

As shown by reference number 1425, in a second scenario, a downlink grant may not be provided for UE 120. For example, BS 110 may determine that a downlink grant is not to be provided to UE 120 during a second DRX cycle period (e.g., based at least in part on BS 110 not having data queued for transmission to UE 120). During the second DRX cycle period, UE 120 may monitor a downlink channel to receive a DCI message, and may fail to decode the downlink channel to receive the DCI message. In this case, UE 120 may not transition from the first bandwidth part to the second bandwidth part based at least in part on failing to decode the downlink channel. In this case, UE 120 may transition from a low-power mode (e.g., associated with monitoring for the downlink channel) to a sleep-mode (e.g., a lower power mode relative to the low-power mode), thereby conserving energy resources.

As indicated above, FIG. 14 is provided as an example. Other examples are possible and may differ from what was described with respect to FIG. 14.

Figure 15:
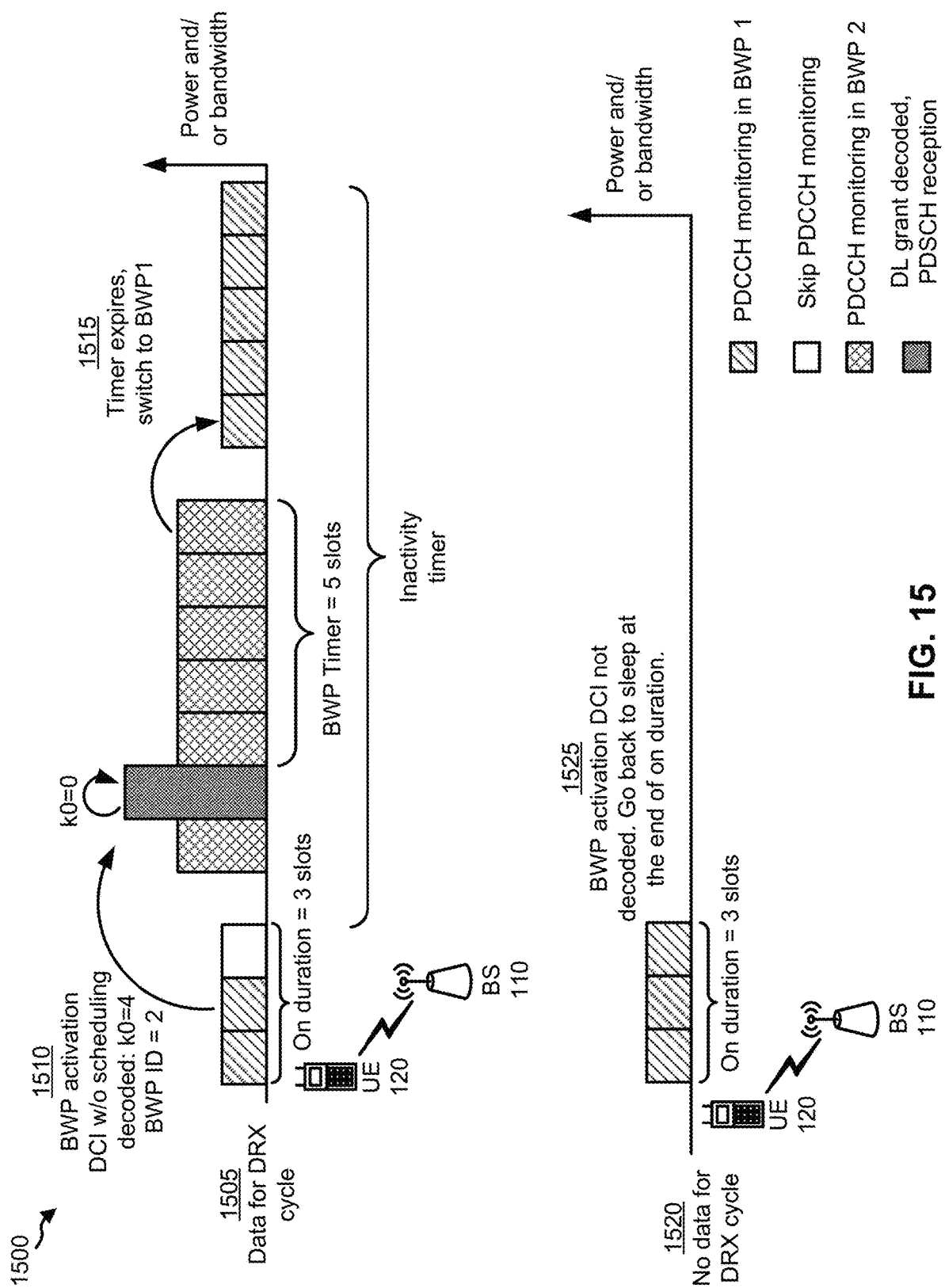

FIG. 15 is a diagram illustrating an example 1500 relating to bandwidth part wake-up signaling, in accordance with various aspects of the present disclosure. As shown in FIG. 15, example 1500 includes a UE 120 in communication with a BS 110 using a bandwidth part of a plurality of bandwidth parts.

As further shown in FIG. 15, and by reference number 1505, in a first scenario a downlink grant may be provided for UE 120. For example, BS 110 may determine that a downlink grant is to be provided to UE 120 during a first DRX cycle period to enable UE 120 to receive queued data from BS 110 during the DRX cycle period. As shown by reference number 1510, during the first DRX cycle period, UE 120 may monitor a downlink channel to receive a DCI message without scheduling information, and may receive the DCI message, which may indicate a transition from a first bandwidth part to a second bandwidth part. In this case, an on duration for monitoring for the PDCCH and the DCI message may be another duration (e.g., 3 slots), and UE 120 may receive the DCI message before completion of the on duration (e.g., in slot 2). As a result, UE 120 may skip PDCCH monitoring for slot 3 of the on duration, and may transition to the second bandwidth part. Based at least in part on using a multi-slot on duration, BS 110 increases a quantity of scheduling opportunities relative to a single slot on duration. Additionally, or alternatively, BS 110 may configure a more frequent PDCCH monitoring periodicity to increase the quantity of scheduling opportunities.

In some aspects, a bandwidth part switch (e.g., from the first bandwidth part to the second bandwidth part) may be triggered using a scheduling DCI. Additionally, or alternatively, the bandwidth part switch may be triggered by a DCI without scheduling (e.g., a zero-resource allocation DCI). In this way, BS 110 may trigger the bandwidth part switch before transmitting a grant, and may transmit the grant before expiration of the bandwidth part timer. In this case, an inactivity timer associated with a DRX sleep mode may be triggered based at least in part on decoding of the grant rather than transmission of a PDSCH. As shown by reference number 1515, based at least in part on expiration of a bandwidth part timer, UE 120 may transition to a default bandwidth part (e.g., the first bandwidth part).

As shown by reference number 1520, in a second scenario, a DCI message may not be decoded by UE 120. For example, BS 110 may determine that a downlink grant is not to be provided to UE 120 during a second DRX cycle period (e.g., based at least in part on BS 110 not having data queued for transmission to UE 120), and may not provide a DCI associated with the downlink grant. Additionally, or alternatively, BS 110 may determine to provide a DCI, but UE 120 may fail to receive and/or successfully decode the DCI. As shown by reference number 1525, UE 120 may monitor a downlink channel to receive a DCI message, and may fail to receive and/or decode the downlink channel to receive the DCI message. In this case, UE 120 may not transition from the first bandwidth part to the second bandwidth part based at least in part on failing to decode the downlink channel, and may transfer from a low-power mode to a sleep mode after completion of an on duration.

As indicated above, FIG. 15 is provided as an example. Other examples are possible and may differ from what was described with respect to FIG. 15.

Figure 16:
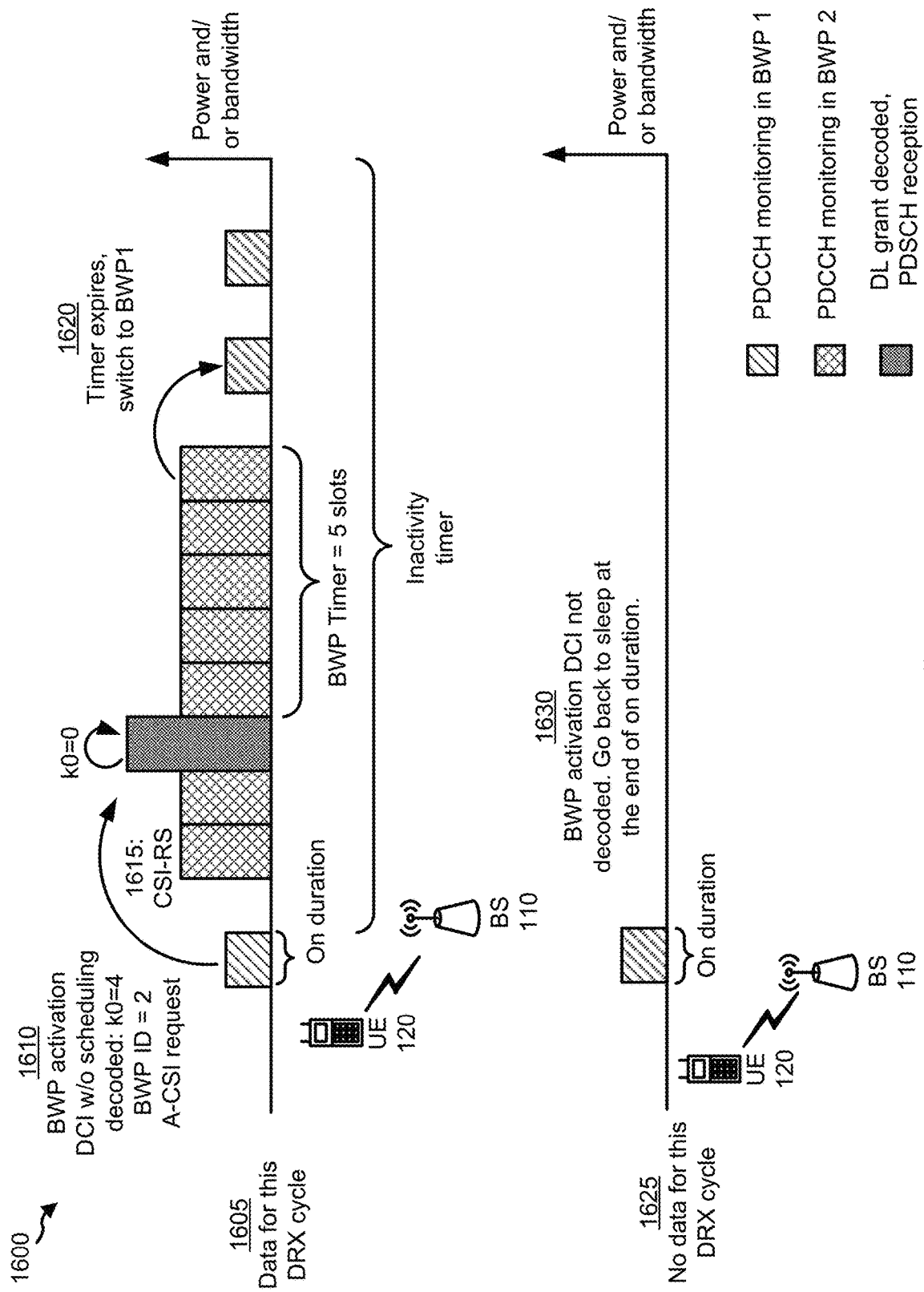

FIG. 16 is a diagram illustrating an example 1600 relating to bandwidth part wake-up signaling, in accordance with various aspects of the present disclosure. As shown in FIG. 16, example 1600 includes a UE 120 in communication with a BS 110 using a bandwidth part of a plurality of bandwidth parts.

As further shown in FIG. 16, and by reference number 1605, in a first scenario, a downlink grant may be provided for UE 120. For example, BS 110 may determine that a downlink grant is to be provided to UE 120 during a first DRX cycle period to enable UE 120 to receive queued data from BS 110 during the first DRX cycle period. As shown by reference number 1610, during the first DRX cycle period, UE 120 may monitor a downlink channel to receive a DCI message. For example, UE 120 may receive a DCI that conveys an aperiodic channel state information (A-CSI) request, with or without another bandwidth part activation DCI. The A-CSI request may be for a channel state information reference signal (CSI-RS) and/or a measurement of a CSI-RS to be provided. For example, BS 110 may request that UE 120 measure a CSI-RS that BS 110 is to provide, and that UE 120 report the measurement of the CSI-RS to BS 110.

In some aspects, the A-CSI request may be associated with a common timing parameter with the bandwidth part transition (e.g., k0). For example, BS 110 may determine to transmit a CSI-RS for measurement by UE 120 k0 slots after the DCI message that includes the A-CSI request. In some aspects, such as for time division duplex communications, BS 110 may transmit an uplink grant associated with an uplink bandwidth part with an A-CSI request to UE 120, and UE 120 may switch to a downlink bandwidth part paired with the uplink bandwidth part. In some aspects, the other bandwidth part activation DCI message may include a zero-resource allocation downlink grant to trigger the switch for the downlink bandwidth part.

In some aspects, the A-CSI request may trigger an inactivity timer. In some aspects, such as for frequency division duplex communications, BS 110 may transmit an uplink grant in connection with an A-CSI request, which may trigger an uplink bandwidth part switch without triggering an inactivity timer, a bandwidth part timer, and/or the like. In some aspects, BS 110 may transmit a downlink grant to trigger a downlink bandwidth part switch in a common slot with the uplink bandwidth part switch. In some aspects, BS 110 may include a bandwidth part identifier for a downlink bandwidth part to trigger a bandwidth part switch in an uplink grant associated with an A-CSI request. In some aspects, the DCI message may include an aperiodic tracking reference signal (A-TRS) request. For example, BS 110 may transmit an A-TRS request with a downlink DCI message to trigger a bandwidth part switch during an on duration and to enable a measurement of a tracking reference signal. In this case, the tracking reference signal may be transmitted and received k0 slots after the downlink DCI message is transmitted.

As shown by reference number 1615, UE 120 may transition from the first bandwidth part to the second bandwidth part based at least in part on receiving the DCI message. In this case, BS 110 may transmit a CSI-RS and UE 120 may measure the CSI-RS using the second bandwidth part based at least in part on the transitioning and k0 slots after the DCI message is transmitted. In some aspects, such as when k0 is not dynamically indicated using DCI signaling, BS 110 and/or UE 120 may determine k0 based at least in part on a set of candidate k0 values (e.g., UE 120 may select a smallest candidate k0 value for k0). In some aspects, UE 120 may report a CSI-RS measurement k2 slots after the DCI message, where k2 is greater than k0. As shown by reference number 1620, after expiration of a bandwidth part timer, UE 120 transitions from the second bandwidth part to the first bandwidth part (e.g., from a high power mode to a low power mode to reduce power consumption). In this case, after expiration of an inactivity timer, UE 120 transfers from the low power mode to a sleep mode (e.g., a lower power mode than the low power mode) to reduce power consumption.

As shown by reference number 1625, in a second scenario, a downlink grant may not be provided for UE 120. For example, BS 110 may determine that a downlink grant is not to be provided to UE 120 during a second DRX cycle period (e.g., based at least in part on BS 110 not having data queued for transmission to UE 120). As shown by reference number 1630, during the second DRX cycle period, UE 120 may monitor a downlink channel to receive a DCI message, and may fail to decode the downlink channel to receive the DCI message. In this case, UE 120 may not transition from the first bandwidth part to the second bandwidth part based at least in part on failing to decode the downlink channel.

As indicated above, FIG. 16 is provided as an example. Other examples are possible and may differ from what was described with respect to FIG. 16.

Figure 17:
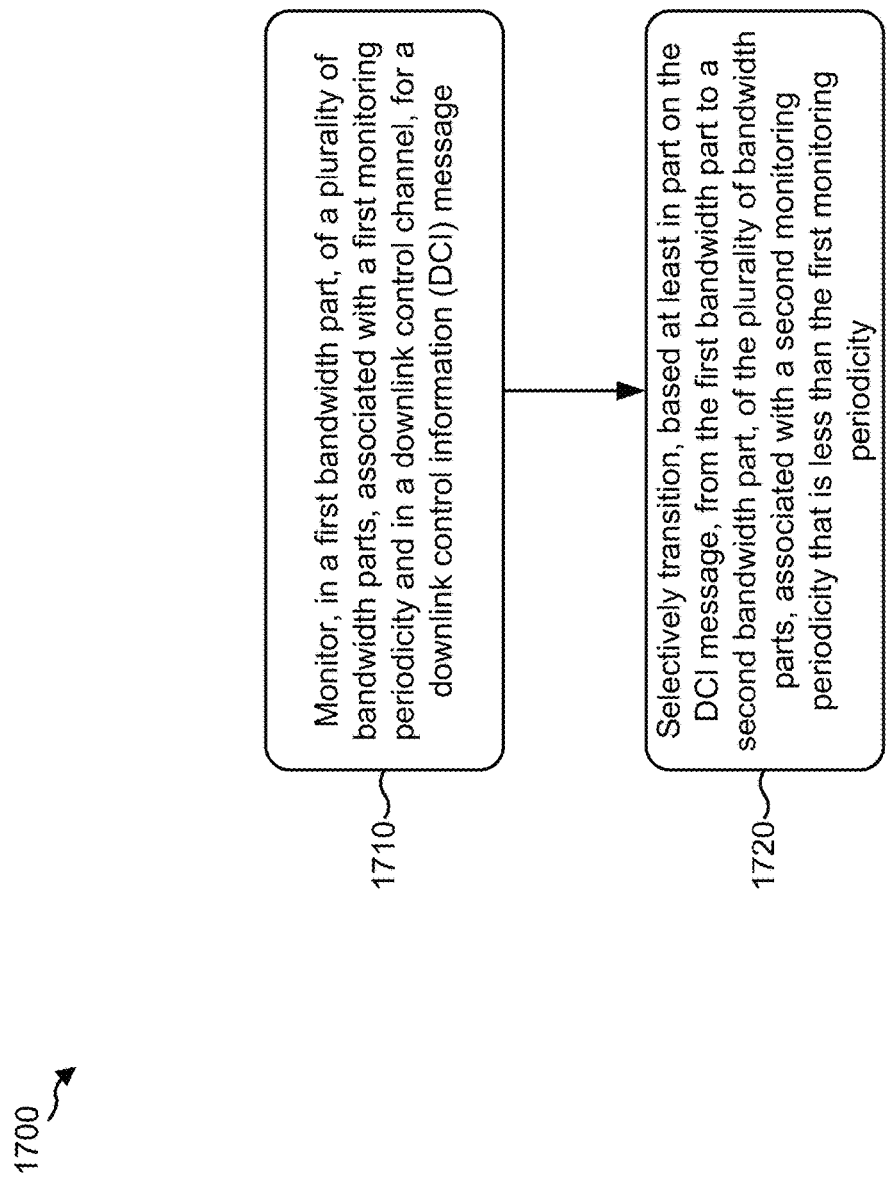
FIG. 17 is a diagram illustrating an example process performed, for example, by a user equipment, in accordance with various aspects of the present disclosure.

FIG. 17 is a diagram illustrating an example process 1700 performed, for example, by a UE, in accordance with various aspects of the present disclosure. Example process 1700 is an example where a UE (e.g., UE 120) performs bandwidth part wake-up signaling.

As shown in FIG. 17, in some aspects, process 1700 may include monitoring, in a first bandwidth part, of a plurality of bandwidth parts, associated with a first monitoring periodicity and in a downlink control channel, for a downlink control information (DCI) message (block 1710). For example, the UE may monitor (e.g., using antenna 252, receive processor 258, controller/processor 280, and/or the like) for the DCI message in the first bandwidth part.

As shown in FIG. 17, in some aspects, process 1700 may include selectively transitioning, based at least in part on the DCI message, from the first bandwidth part to a second bandwidth part, of the plurality of bandwidth parts, associated with a second monitoring periodicity that is less than the first monitoring periodicity (block 1720). For example, the UE may selectively transition (e.g., using antenna 252, receive processor 258, transmit processor 264, controller/processor 280, and/or the like) from the first bandwidth part to the second bandwidth part.

Process 1700 may include additional aspects, such as any single aspect or any combination of aspects described below.

In some aspects, a bandwidth part configuration for the first bandwidth part or the second bandwidth part includes a downlink control channel monitoring periodicity. In some aspects, a bandwidth part configuration for the first bandwidth part or the second bandwidth part includes one or more timing parameters. In some aspects, the DCI message is received based at least in part on a data traffic characteristic.

In some aspects, the first bandwidth part is associated with a first monitoring mode associated with less than a threshold data traffic and greater than a threshold latency, and the second bandwidth part is associated with a second monitoring mode associated with not less than the threshold data traffic and not greater than the threshold latency. In some aspects, the first bandwidth part is associated with greater than a threshold timing parameter, greater than a threshold downlink control channel monitoring periodicity, and less than a threshold bandwidth, and the second bandwidth part is associated with not greater than the threshold timing parameter, not greater than the threshold downlink control channel monitoring periodicity, and not less than the threshold bandwidth. In some aspects, the first bandwidth part is associated with a first wake-up stage and the second bandwidth part is associated with a second wake-up stage, and the UE is configured to monitor the first bandwidth part during an on duration of a discontinuous reception mode cycle.

In some aspects, the UE is configured to monitor the first bandwidth part during an on duration of a discontinuous reception mode cycle. In some aspects, the UE is configured to monitor the downlink control channel in the first bandwidth part in a low power mode of a plurality of power modes. In some aspects, the UE is not scheduled for data traffic during a discontinuous reception mode cycle and the UE is configured to transfer to a sleep mode at an end of an on duration of the discontinuous reception mode cycle.

In some aspects, the UE is scheduled for data traffic during a discontinuous reception mode cycle and the UE is configured to receive the DCI message based at least in part on the monitoring, and the UE is configured to transition to the second bandwidth part to receive data based at least in part on the DCI message indicating that the UE is scheduled for data traffic. In some aspects, the UE is scheduled for data traffic during a discontinuous reception mode cycle and the UE is configured to not transition to the second bandwidth part, and the UE is configured to receive data using the first bandwidth part after a threshold period of time.

In some aspects, the UE is configured to transition from the first bandwidth part to the second bandwidth part in a threshold quantity of time. In some aspects, the UE is configured to monitor the downlink control channel, decode a downlink grant, and receive downlink data on the second bandwidth part based at least in part on transitioning to the second bandwidth part. In some aspects, the UE is configured to transition to a default bandwidth part after expiration of a bandwidth part timer to monitor the downlink control channel and transfer to a sleep mode after expiration of an inactivity timer.

In some aspects, the default bandwidth part is one of the first bandwidth part or the second bandwidth part. In some aspects, an on duration for monitoring for the DCI message is greater than one slot. In some aspects, a scheduling shared channel message is transmitted during a threshold quantity of slots after the DCI message.

In some aspects, the DCI message includes an indication for a zero-resource allocation, and the transitioning to the second bandwidth part is triggered by the DCI message. In some aspects, the DCI message triggers an inactivity timer. In some aspects, an aperiodic channel state information (A-CSI) request is conveyed by the DCI message.

In some aspects, a channel state information reference signal (CSI-RS) is transmitted a threshold quantity of slots after the DCI message. In some aspects, the DCI message triggers the transitioning to the second bandwidth part for downlink communication. In some aspects, the DCI message triggers the transitioning to the second bandwidth part for uplink communication. In some aspects, the DCI message triggers an inactivity timer.

In some aspects, the DCI message includes an aperiodic tracking reference signal (A-TRS) request. In some aspects, a timing for a gap between receipt of the DCI message and a grant transmission is used for a channel state information reference signal (CSI-RS).

In some aspects, the timing is at least one of a dynamically indicated timing or a statically preconfigured timing. In some aspects, a reporting of a measurement associated with the CSI-RS is performed based at least in part on another timing for another gap, and the other timing for the other gap is not less than the timing for the gap. In some aspects, the UE is configured to transfer from a sleep mode to an on duration of a discontinuous reception mode cycle and select a default bandwidth part for the first bandwidth part and for a primary cell and a secondary cell.

In some aspects, the UE is configured to transfer from a sleep mode to an on duration of a discontinuous reception mode cycle and select a previously active bandwidth part for the first bandwidth part. In some aspects, the UE is configured to transfer from a sleep mode to an on duration of a discontinuous reception mode cycle and select a configured bandwidth part for at least one of a primary cell or a secondary cell.

In some aspects, a bandwidth part timer is reset after a transfer to a sleep mode. In some aspects, the DCI message is successfully received and the UE transitions to the second bandwidth part. In some aspects, the DCI message is not successfully received and the UE does not transition to the second bandwidth part.

Although FIG. 17 shows example blocks of process 1700, in some aspects, process 1700 may include additional blocks, fewer blocks, different blocks, or differently arranged blocks than those depicted in FIG. 17. Additionally, or alternatively, two or more of the blocks of process 1700 may be performed in parallel.

Figure 18:
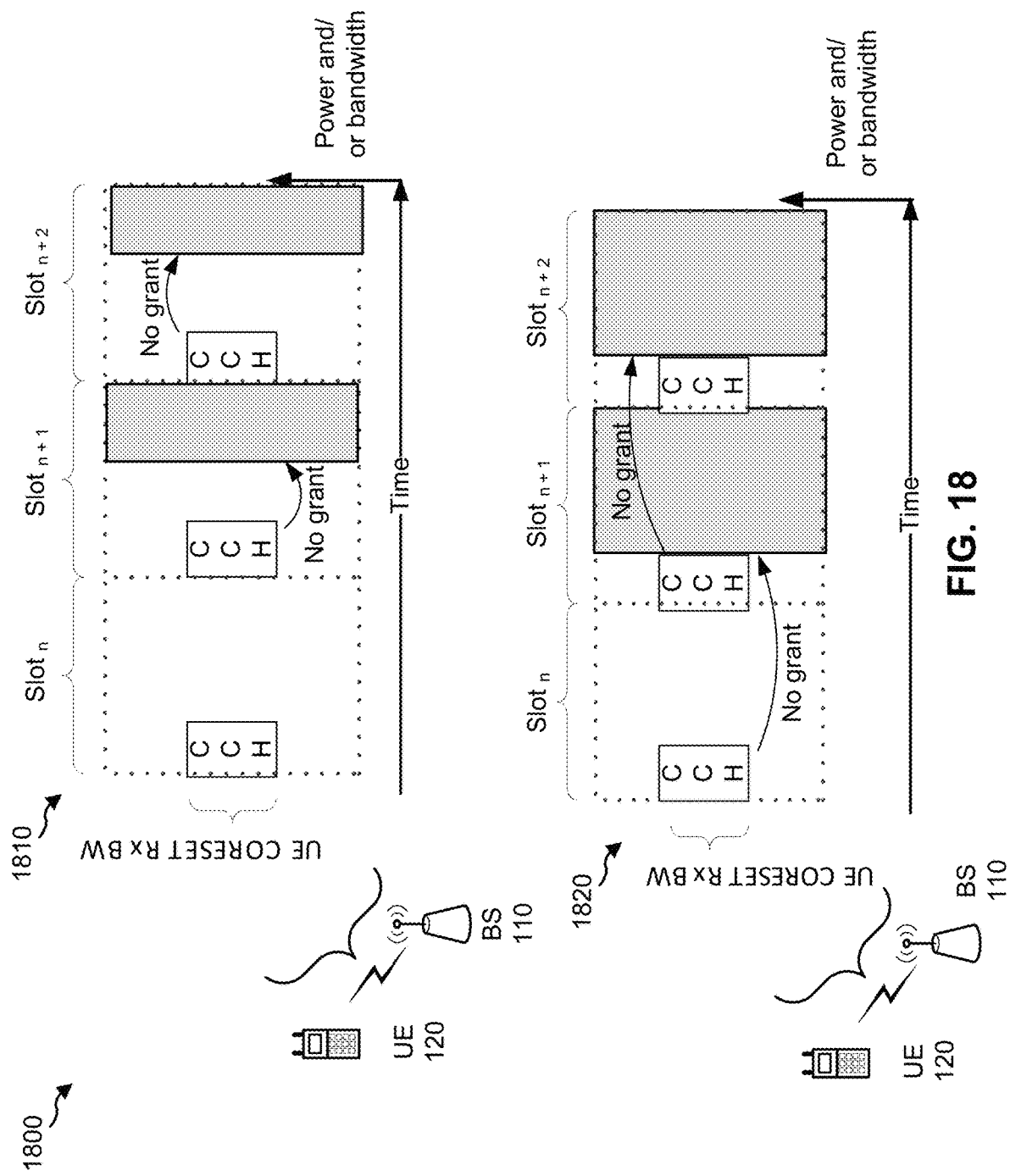
FIGS. 18-20 are diagrams illustrating examples relating to bandwidth part wake-up signaling, in accordance with various aspects of the present disclosure.

FIG. 18 is a diagram illustrating an example 1800 of bandwidth part signaling and cross slot scheduling, in accordance with various aspects of the present disclosure.

As shown in FIG. 18, example 1800 includes a UE 120 communicating with a BS 110 using a particular core resource set (CORESET) bandwidth part. In some aspects, UE 120 may receive information from BS 110 via a downlink bandwidth part.

As further shown in FIG. 18, and by reference number 1810, UE 120 may receive a set of control channel communications. For example, UE 120 may receive a control channel communication in a first slot ($Slot_n$), a second slot ($Slot_{n+1}$), a third slot ($Slot_{n+2}$), and/or the like. In this case, some control channels are associated with indicating that a grant is not to occur in a same slot. For example, a control channel communication in the second slot is associated with indicating that there is no grant for the second slot.

In contrast, as shown by reference number 1820, UE 120 may receive another set of control channel communications associated with indicating slots that do not have a grant. For example, a control channel communication in a first slot may be associated with indicating no grant for a second slot, and a control channel transmission in the second slot may be associated with indicating no grant for a third slot. In this case, by setting a timing parameter, $k_0$, described above, to a value greater than 0 and by using cross-slot scheduling to indicate a lack of a grant for an upcoming slot, UE 120 enables use of a microsleep mode in the upcoming slot. For example, UE 120 may transition to the microsleep mode in the second slot after receiving the control channel rather than remaining in a reception mode while processing the control channel to determine whether a grant is scheduled for a same slot. In some aspects, UE 120 may store information indicating that another periodic signal is not to be provided in a slot. For example, UE 120 may store information indicating that in the second slot of reference number 1820, another periodic signal is not expected after the control channel, thereby enabling UE 120 to enter the microsleep mode without missing reception of a communication.

As indicated above, FIG. 18 is provided as an example. Other examples are possible and may differ from what was described with respect to FIG. 18.

Figure 19:
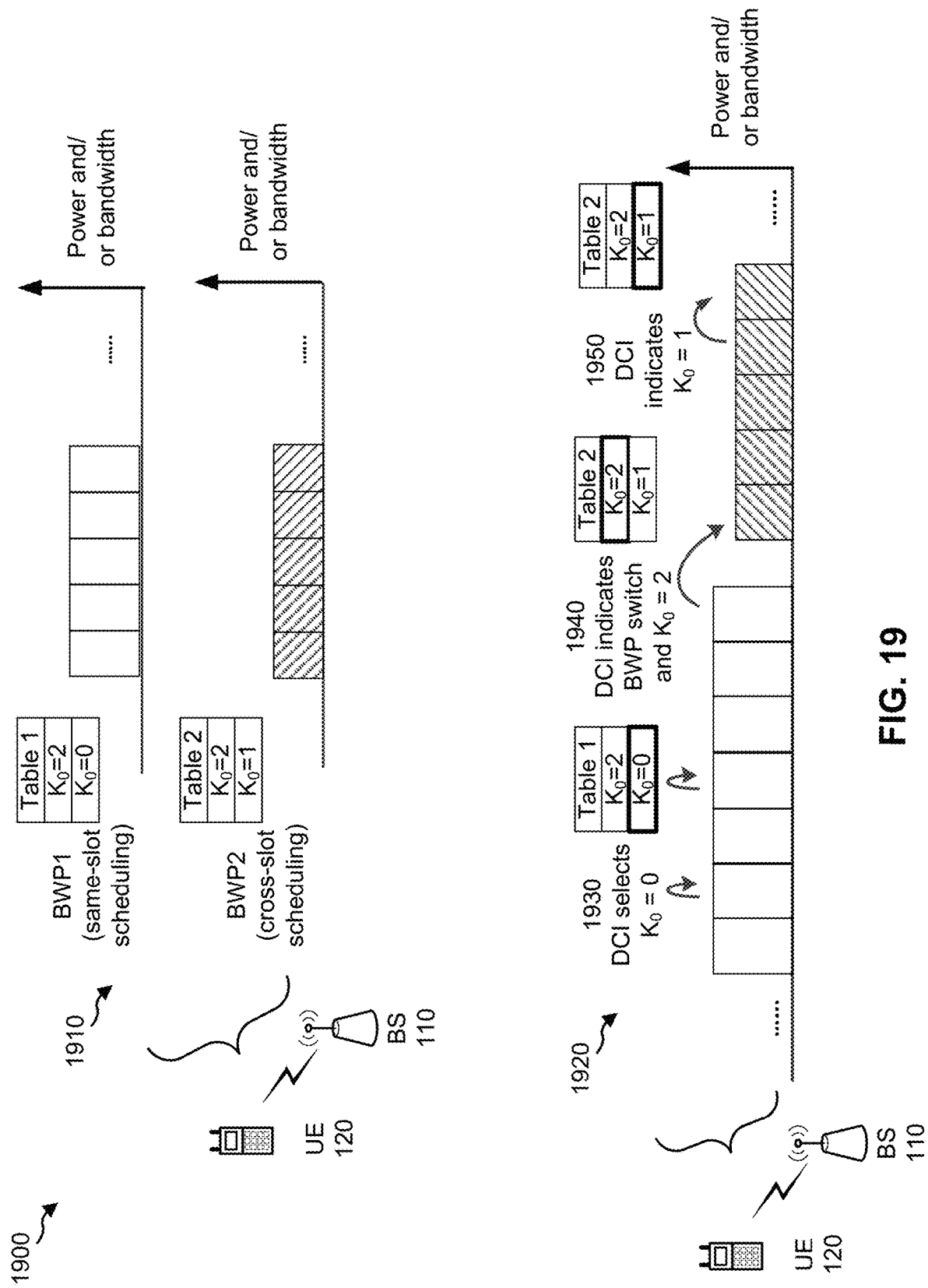

FIG. 19 is a diagram illustrating an example 1900 of bandwidth part signaling and cross slot scheduling, in accordance with various aspects of the present disclosure.

As shown in FIG. 19, and by reference number 1910, UE 120 may communicate with BS 110 via a plurality of bandwidth parts. For example, UE 120 may communicate with BS 110 using a first bandwidth part (BWP1) configured for same-slot downlink scheduling (e.g., thereby enabling reduced latency relative to cross-slot scheduling) and using a second bandwidth part (BWP2) configured for cross-slot downlink scheduling (e.g., thereby enabling use of a microsleep mode and reduced power consumption relative to same-slot scheduling). In some aspects, UE 120 may store information identifying a set of candidate timing parameters for downlink scheduling (e.g., $k_0$ parameters) for each bandwidth part, such as a first table of candidate timing parameters for the first bandwidth part and a second table of candidate timing parameters for the second bandwidth part. In some aspects, all bandwidth parts may be configured for cross-slot uplink scheduling (e.g., with tables of uplink candidate timing parameters $k_2 > 0$).

As further shown in FIG. 19, and by reference number 1920, during operation, UE 120 may initially use the first bandwidth part. As shown by reference number 1930, based at least in part on receiving a downlink (DL) downlink control information (DCI) message, UE 120 may be configured to use a particular timing parameter of the first table of candidate timing parameters (e.g., $k_0 = 0$) for communication with BS 110.

As further shown in FIG. 19, and by reference number 1940, based at least in part on receiving another downlink DCI indicating a bandwidth part switch to the second bandwidth part, UE 120 may transition to the second bandwidth part and select a particular timing parameter from the second table of candidate timing parameters. In some aspects, UE 120 may be configured to select a particular candidate timing parameter. For example, UE 120 may be configured to select a particular candidate timing parameter associated with a lowest latency or the bandwidth part switch relative to other candidate timing parameters (e.g., $k_0 = 2$).

As further shown in FIG. 19 and by reference number 1950, UE 120 may receive another downlink DCI associated with indicating that UE 120 is to select a different candidate timing parameter associated with using cross-slot scheduling to enable the microsleep mode. In this way, UE 120 may use a plurality of bandwidth parts, and bandwidth part transitions associated therewith to enable a threshold level of latency when the threshold level of latency is to be achieved and a threshold level of power resource utilization (e.g., achieved via using the microsleep mode) when the threshold level of power resource utilization is to be achieved.

As indicated above, FIG. 19 is provided as an example. Other examples are possible and may differ from what was described with respect to FIG. 19.

Figure 20:
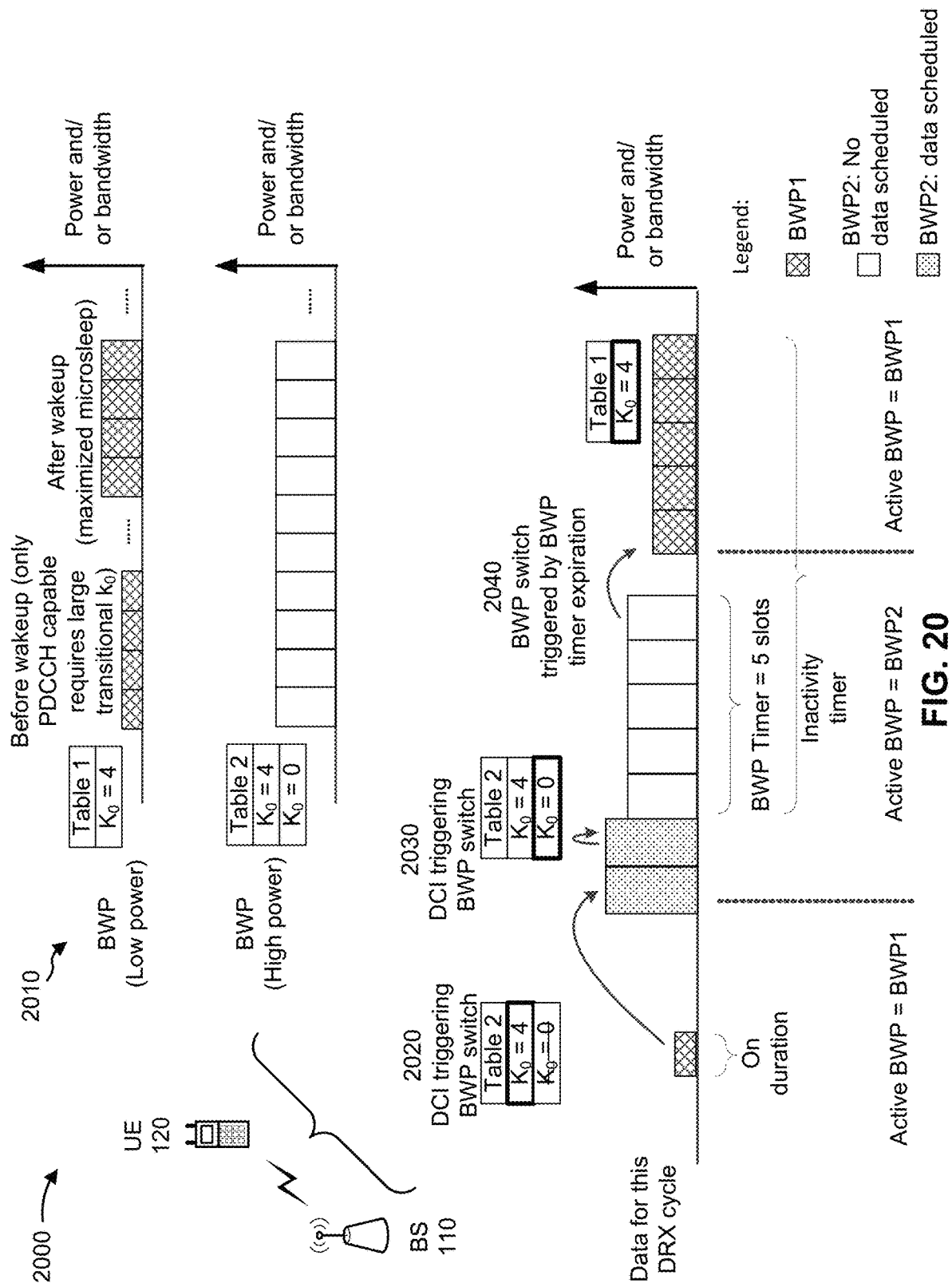

FIG. 20 is a diagram illustrating an example 2000 of bandwidth part signaling and cross slot scheduling, in accordance with various aspects of the present disclosure.

As shown in FIG. 20, and by reference number 2010, UE 120 may communicate with BS 110 using a plurality of bandwidth parts, such as a first bandwidth part (BWP1) configured as a low power bandwidth part configured for cross-slot scheduling in a non-CDRX mode and a second bandwidth part (BWP2) configured as a high power bandwidth part configured for cross-slot scheduling in a CDRX mode. In some aspects, the plurality of bandwidth parts may be associated with one or more candidate timing parameters. For example, UE 120 may store information identifying a first set of candidate timing parameters for the first bandwidth part (e.g., a first table of candidate timing parameters) and a second set of candidate timing parameters for the second bandwidth part (e.g., a second table of candidate timing parameters). In some aspects, the plurality of bandwidth parts may be associated with different bandwidths (e.g., the first bandwidth part may have a smaller bandwidth than the second bandwidth part).

In some aspects, a bandwidth part may be associated with a plurality of power levels. For example, BS 110 and/or UE 120 may be configured to use a first power level for the first bandwidth part before waking up from a sleep mode, and may be configured to use a second power level for the first bandwidth part after waking up and when configured for a microsleep mode. In this case, UE 120 may use a relatively large timing parameter ($k_0 = 4$) for the first bandwidth part, thereby enabling the microsleep mode after wake up from the sleep mode and reception of a PDCCH during the sleep mode.

As further shown in FIG. 20, and by reference number 2020, UE 120 may initially operate in the sleep mode on the first bandwidth part, and may receive a downlink DCI triggering a bandwidth part switch. For example, during an on duration, UE 120 may receive a downlink DCI associated with triggering a transition to the second bandwidth part. In this case, UE 120 may be configured to use a first table entry as a timing parameter based at least in part on the second table entry not being addressable for the downlink DCI when UE 120 is operating on the first bandwidth part.

As shown by reference number 2030, when operating in the second bandwidth part, UE 120 may receive an indicator to switch to a different timing parameter ($k_0 = 0$) for the second bandwidth part. In this way, UE 120 enables a multi-stage (e.g., two-stage) wake-up procedure for the CDRX mode, thereby enabling reduced power utilization relative to, for example, a one-stage wake-up procedure directly from a sleep mode to a reception mode (e.g., without a microsleep mode). In some aspects, after reception of the scheduled data, UE 120 may transition from a first power level of the second bandwidth part to a second power level of the second bandwidth part, thereby reducing a power utilization, and may activate an inactivity timer and a bandwidth part timer.

As further shown in FIG. 20, and by reference number 2040, based at least in part on expiration of the bandwidth part timer without receiving another message associated with scheduling data, UE 120 may transition from the second bandwidth part to the first bandwidth part to further reduce a power utilization by enabling a microsleep mode in the first bandwidth part, and may operate in the first bandwidth part. In this case, after expiration of the inactivity timer, UE 120 may transition from a first power level of the first bandwidth part to a second, lower power level of the first bandwidth part to enable a sleep mode, thereby further reducing power utilization. In this way, UE 120 may enable a multi-stage wake-up and sleep procedure in the CDRX mode to reduce power utilization. In some aspects, UE 120 may enable the multi-stage wake-up and sleep procedure for an uplink bandwidth part. In this case, candidate timing parameters may be configured such that $k_2>2$, such as the first bandwidth part having $k_2=4$ and the second bandwidth part having $k_2=4$ or 2.

As indicated above, FIG. 20 is provided as an example. Other examples are possible and may differ from what was described with respect to FIG. 20.

Figure 21:
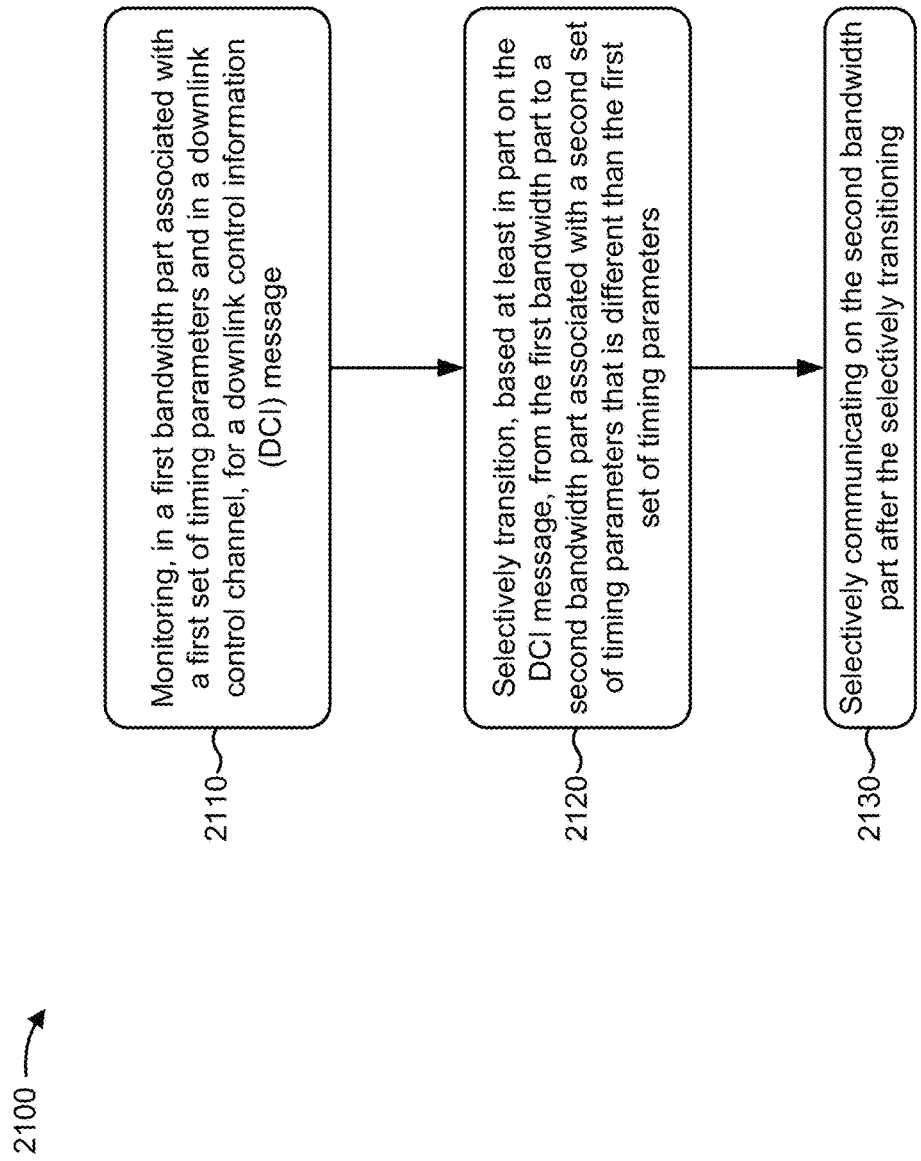
FIG. 21 is a diagram illustrating an example process performed, for example, by a user equipment, in accordance with various aspects of the present disclosure.

FIG. 21 is a diagram illustrating an example process 2100 performed, for example, by a UE, in accordance with various aspects of the present disclosure. Example process 2100 is an example where a UE (e.g., UE 120) performs bandwidth part monitoring and cross-slot scheduling.

As shown in FIG. 21, in some aspects, process 2100 may include monitoring, in a first bandwidth part associated with a first set of timing parameters and in a downlink control channel, for a downlink control information (DCI) message (block 2110). For example, the UE (e.g., using antenna 252, DEMOD 254, MIMO detector 256, receive processor 258, controller/processor 280, and/or the like) may monitor, in a first bandwidth part associated with a first set of timing parameters and in a downlink control channel, for a downlink control information (DCI) message, as described above.

As shown in FIG. 21, in some aspects, process 2100 may include selectively transitioning from the first bandwidth part to a second bandwidth part, of the plurality of bandwidth parts, associated with a second set of timing parameters that is different than the first set of timing parameters (block 2120). For example, the UE (e.g., using controller/processor 280 and/or the like) may selectively transition, based at least in part on the DCI message, from the first bandwidth part to a second bandwidth part associated with a second set of timing parameters that is different than the first set of timing parameters, as described above.

As shown in FIG. 21, in some aspects, process 2100 may include selectively communicating on the second bandwidth part after the selectively transitioning (block 2130). For example, the UE (e.g., using antenna 252, DEMOD 254, MIMO detector 256, receive processor 258, transmit processor 264, controller/processor 280, and/or the like) may selectively communicate on the second bandwidth part after the selectively transitioning, as described above. In some aspects, the UE may transition, and may communicate (e.g., transmit and/or receive). In some aspects, the UE may not transition, and may not communicate.

Process 2100 may include additional aspects, such as any single aspect or any combination of aspects described below and/or in connection with one or more other processes described elsewhere herein.

In some aspects, data is scheduled across a plurality of consecutive slots. In some aspects, the UE is configured to operate in a microsleep mode. In some aspects, the UE determines a scheduling delay value associated with a first monitoring period in the first bandwidth part or a second monitoring period in the second bandwidth part based at least in part on stored information identifying a plurality of candidate channel scheduling values. In some aspects, a microsleep mode is enabled after a last downlink control symbol and for at least a non-scheduled slot. In some aspects, the UE is configured to transition between a same-slot scheduling mode and a cross-slot scheduling mode.

In some aspects, one of the first bandwidth part or the second bandwidth part is associated with the same-slot scheduling mode and another of the first bandwidth part or the second bandwidth part is associated with the cross-slot scheduling mode. In some aspects, the DCI message identifies a plurality of candidate channel delay values for at least one type of channel delay value of a plurality of types of channel delay value. In some aspects, the DCI message indicates a transition from a same-slot scheduling mode to a cross-slot scheduling mode or from the cross-slot scheduling mode to the same-slot scheduling mode.

In some aspects, a transition from a same-slot scheduling mode to a cross-slot scheduling mode or from the cross-slot scheduling mode to the same-slot scheduling mode is triggered based at least in part on expiration of a timer. In some aspects, the UE is configured to support a plurality of wake-up stages, and wherein the plurality of wake-up stages include a grant processing, lower power level wake-up stage and include a full operation, high power level wake-up stage. In some aspects, during an on duration of a connected mode discontinuous reception (CDRX) mode the UE is configured to wake on the first bandwidth part, which is a grant-processing only bandwidth part, and is configured to transition to the second bandwidth part, which is not a grant-processing only bandwidth part, based at least in part on detecting a grant, and the second bandwidth part is associated with a smaller delay value and a larger bandwidth than the first bandwidth part.

Although FIG. 21 shows example blocks of process 2100, in some aspects, process 2100 may include additional blocks, fewer blocks, different blocks, or differently arranged blocks than those depicted in FIG. 21. Additionally, or alternatively, two or more of the blocks of process 2100 may be performed in parallel.

The foregoing disclosure provides illustration and description, but is not intended to be exhaustive or to limit the aspects to the precise form disclosed. Modifications and variations are possible in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set. A phrase referring to "at least one of" a list of items refers to any combination of those items, including single members. As an example, "at least one of: a, b, or c"

is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c). Similarly, as used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   monitoring, in a first bandwidth part associated with a first set of downlink timing parameters and in a downlink control channel, for a downlink control information (DCI) message;
   selectively transitioning, based at least in part on the DCI message, from the first bandwidth part to a second bandwidth part associated with a second set of downlink timing parameters that is different than the first set of downlink timing parameters,
     wherein the UE is configured to support a plurality of wake-up stages,
     wherein the plurality of wake-up stages include a grant processing, lower power level wake-up stage and include a full operation, high power level wake-up stage,
     wherein the first bandwidth part and the second bandwidth part are each associated with a set of uplink timing parameters, $k_2$, that are configured for cross-slot scheduling, and
     wherein the first bandwidth part and the second bandwidth part are configured such that $k_2$ is at least 2; and
   selectively communicating on the second bandwidth after the selectively transitioning.

2. The method of claim 1, wherein data is scheduled across a plurality of consecutive slots.

3. The method of claim 1, wherein the UE is configured to operate in a microsleep mode.

4. The method of claim 1, wherein the UE determines a scheduling delay value associated with a first monitoring period in the first bandwidth part or a second monitoring period in the second bandwidth part based at least in part on stored information identifying a plurality of candidate channel scheduling values.

5. The method of claim 4, wherein a microsleep mode is enabled after a last downlink control symbol and for at least a non-scheduled slot.

6. The method of claim 1, wherein the UE is configured to transition between a same-slot scheduling mode and a cross-slot scheduling mode.

7. The method of claim 6, wherein one of the first bandwidth part or the second bandwidth part is associated with the same-slot scheduling mode and another of the first bandwidth part or the second bandwidth part is associated with the cross-slot scheduling mode.

8. The method of claim 1, wherein the DCI message identifies a plurality of candidate channel delay values for at least one type of channel delay value of a plurality of types of channel delay values.

9. The method of claim 1, wherein the DCI message indicates a transition from a same-slot scheduling mode to a cross-slot scheduling mode or from the cross-slot scheduling mode to the same-slot scheduling mode.

10. The method of claim 1, wherein a transition from a same-slot scheduling mode to a cross-slot scheduling mode or from the cross-slot scheduling mode to the same-slot scheduling mode is triggered based at least in part on expiration of a timer.

11. The method of claim 1, wherein during an on duration of a connected mode discontinuous reception (CDRX) mode the UE is configured to wake on the first bandwidth part, which is a grant-processing only bandwidth part, and is configured to transition to the second bandwidth part, which is not a grant-processing only bandwidth part, based at least in part on detecting a grant,
   wherein the second bandwidth part is associated with a smaller delay value and a bandwidth not smaller than the first bandwidth part.

12. A user equipment (UE) for wireless communication, comprising:
   memory; and
   one or more processors coupled to the memory; and
   instructions stored in the memory and operable, when executed by the one or more processors to cause the UE to:
     monitor, in a first bandwidth part, of a plurality of bandwidth parts, associated with a first monitoring periodicity and in a downlink control channel, for a downlink control information (DCI) message; and
     selectively transition, based at least in part on the DCI message, from the first bandwidth part to a second bandwidth part, of the plurality of bandwidth parts, associated with a second monitoring periodicity that is less than the first monitoring periodicity,
       wherein the UE is configured to support a plurality of wake-up stages,
       wherein the plurality of wake-up stages include a grant processing, lower power level wake-up stage and include a full operation, high power level wake-up stage,
       wherein the first bandwidth part and the second bandwidth part are each associated with a set of uplink timing parameters, $k_2$, that are configured for cross-slot scheduling, and
       wherein the first bandwidth part and the second bandwidth part are configured such that $k_2$ is at least 2.

13. The UE of claim 12, wherein data is scheduled across a plurality of consecutive slots.

14. The UE of claim 12, wherein the UE is configured to operate in a microsleep mode.

15. The UE of claim 12, wherein the UE is configured to determine a channel delay value associated with a first monitoring period in the first bandwidth part or a second monitoring period in the second bandwidth part based at least in part on stored information identifying a plurality of candidate channel delay values.

16. A non-transitory computer-readable medium storing instructions for wireless communication,
that, when executed by one or more processors of a user equipment (UE), cause the UE to:
monitor, in a first bandwidth part, of a plurality of bandwidth parts, associated with a first monitoring periodicity and in a downlink control channel, for a downlink control information (DCI) message,
wherein the DCI message includes bandwidth part activation information or bandwidth part activation information and a downlink grant,
wherein the DCI is a user equipment-specific, bandwidth part-specific DCI; and
selectively transition, based at least in part on the DCI message, from the first bandwidth part to a second bandwidth part, of the plurality of bandwidth parts, associated with a second monitoring periodicity that is less than the first monitoring periodicity,
wherein the UE is configured to support a plurality of wake-up stages,
wherein the plurality of wake-up stages include a grant processing, lower power level wake-up stage and include a full operation, high power level wake-up stage,
wherein the first bandwidth part and the second bandwidth part are each associated with a set of uplink timing parameters, $k_2$, that are configured for cross-slot scheduling, and
wherein the first bandwidth part and the second bandwidth part are configured such that $k_2$ is at least 2.

17. The non-transitory computer-readable medium of claim 16, wherein the DCI message identifies a size of a gap between the DCI message and a grant transmission.

18. The non-transitory computer-readable medium of claim 16, wherein a size of a gap between the DCI message and a grant transmission is greater than a state transition time for a modem of the UE.

19. The non-transitory computer-readable medium of claim 16, wherein the first monitoring periodicity is greater than a size of a gap between the DCI message and a grant transmission.

20. The non-transitory computer-readable medium of claim 16, wherein the first monitoring periodicity is greater than an on duration of the UE.

21. The non-transitory computer-readable medium of claim 16, wherein the UE does not decode the downlink control channel in connection with monitoring the downlink control channel.

22. The non-transitory computer-readable medium of claim 16, wherein selectively transitioning comprises forgoing transitioning to the second bandwidth part based at least in part on not decoding the downlink control channel.

23. The non-transitory computer-readable medium of claim 16, wherein the UE is configured to transition from a low-power mode to a sleep mode based at least in part on not decoding the downlink control channel.

24. The non-transitory computer-readable medium of claim 16, wherein the UE is not scheduled for a discontinuous reception cycle that includes the monitoring.

25. An apparatus for wireless communication, comprising:
means for monitoring, in a first bandwidth part, of a plurality of bandwidth parts, associated with a first monitoring periodicity and in a downlink control channel, for a downlink control information (DCI) message; and
means for selectively transitioning, based at least in part on the DCI message, from the first bandwidth part to a second bandwidth part, of the plurality of bandwidth parts, associated with a second monitoring periodicity that is less than the first monitoring periodicity,
wherein the apparatus is configured to support a plurality of wake-up stages,
wherein the plurality of wake-up stages include a grant processing, lower power level wake-up stage and include a full operation, high power level wake-up stage,
wherein the first bandwidth part and the second bandwidth part are each associated with a set of uplink timing parameters, $k_2$, that are configured for cross-slot scheduling, and
wherein the first bandwidth part and the second bandwidth part are configured such that $k_2$ is at least 2.

26. The apparatus of claim 25, wherein a bandwidth part configuration for the first bandwidth part or the second bandwidth part includes a downlink control channel monitoring periodicity.

27. The apparatus of claim 25, wherein a bandwidth part configuration for the first bandwidth part or the second bandwidth part includes one or more downlink timing parameters.

28. The apparatus of claim 25, wherein the DCI message is received based at least in part on a data traffic characteristic.

29. The apparatus of claim 25, wherein the first bandwidth part is associated with a first monitoring mode associated with less than a threshold data traffic and greater than a threshold latency, and
wherein the second bandwidth part is associated with a second monitoring mode associated with not less than the threshold data traffic and not greater than the threshold latency.

30. The apparatus of claim 25, wherein during an on duration of a connected mode discontinuous reception (CDRX) mode the apparatus is configured to wake on the first bandwidth part, which is a grant-processing only bandwidth part, and is configured to transition to the second bandwidth part, which is not a grant-processing only bandwidth part, based at least in part on detecting a grant,
wherein the second bandwidth part is associated with a smaller delay value and a bandwidth not smaller than the first bandwidth part.

* * * * *